United States Patent
Nakamura et al.

(10) Patent No.: US 7,897,322 B2
(45) Date of Patent: **\*Mar. 1, 2011**

(54) INK COMPOSITION, INKJET RECORDING METHOD, PRODUCING METHOD OF PLANOGRAPHIC PRINTING PLATE, AND PLANOGRAPHIC PRINTING PLATE

(75) Inventors: Ippei Nakamura, Haibara-gun (JP); Seishi Kasai, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 11/646,376

(22) Filed: Dec. 28, 2006

(65) Prior Publication Data

US 2007/0146431 A1    Jun. 28, 2007

(30) Foreign Application Priority Data

Dec. 28, 2005 (JP) ................... 2005-380190
Dec. 28, 2005 (JP) ................... 2005-380193
Dec. 28, 2005 (JP) ................... 2005-380194

(51) Int. Cl.
*B05D 1/32* (2006.01)
*B41N 1/00* (2006.01)
*C09D 11/00* (2006.01)
*G03C 1/00* (2006.01)

(52) U.S. Cl. ............. 430/302; 101/453; 101/463.1; 101/465; 101/466; 523/160

(58) Field of Classification Search ............ 430/270.1, 430/281.1, 302
See application file for complete search history.

(56) References Cited

U.S. PATENT DOCUMENTS

| | | | |
|---|---|---|---|
| 4,003,751 A | 1/1977 | Carder | |
| 6,020,400 A * | 2/2000 | Anton et al. | 523/161 |
| 6,280,905 B1 * | 8/2001 | Koshimura et al. | 430/281.1 |
| 6,790,875 B2 | 9/2004 | Noguchi et al. | |
| 6,861,200 B2 | 3/2005 | Oshima | |
| 7,303,857 B2 | 12/2007 | Goto | |
| 7,338,748 B2 | 3/2008 | Sugasaki et al. | |
| 2002/0048725 A1 | 4/2002 | Oshima | |
| 2002/0065335 A1 | 5/2002 | Noguchi et al. | |
| 2003/0035917 A1 * | 2/2003 | Hyman | 428/67 |
| 2003/0105201 A1 | 6/2003 | Auschra et al. | |
| 2004/0099170 A1 * | 5/2004 | Takabayashi | 101/491 |
| 2004/0118308 A1 * | 6/2004 | Ohigashi et al. | 101/459 |
| 2006/0069216 A1 * | 3/2006 | Isozaki et al. | 525/479 |
| 2006/0128823 A1 * | 6/2006 | Tsuchimura et al. | 522/71 |
| 2006/0238564 A1 * | 10/2006 | Ishihara | 347/36 |
| 2007/0060665 A1 | 3/2007 | Nakamura | |
| 2007/0071953 A1 * | 3/2007 | Nakamura | 428/195.1 |
| 2007/0146431 A1 | 6/2007 | Nakamura et al. | |
| 2008/0250973 A1 | 10/2008 | Leenders et al. | |
| 2008/0287605 A1 * | 11/2008 | Sugawara et al. | 525/123 |
| 2009/0291225 A1 * | 11/2009 | Takabayashi | 427/487 |

FOREIGN PATENT DOCUMENTS

| | | |
|---|---|---|
| EP | 1046957 A1 | 10/2000 |
| EP | 1176467 A | 1/2002 |
| EP | 1188806 A2 | 3/2002 |
| EP | 1275689 A1 | 1/2003 |
| EP | 1449652 A2 | 8/2004 |
| EP | 1452569 A1 * | 9/2004 |
| EP | 1767600 A2 | 3/2007 |
| JP | 03-087744 A | 4/1991 |
| JP | 5-214280 A | 8/1993 |
| JP | 2003/026711 A | 1/2003 |
| JP | 2003/192943 A | 7/2003 |
| JP | 2003-192944 A | 7/2003 |
| JP | 2003/246818 A | 9/2003 |
| WO | WO 2006112241 A1 * | 10/2006 |

OTHER PUBLICATIONS

European Search Report dated Dec. 27, 2006.
European Search Report dated Mar. 2, 2007.
Notice of Allowance issued for U.S. Appl. No. 11/527,544 dated Feb. 8, 2010.
Office Action issued for U.S. Appl. No. 11/527,544 dated Jun. 25, 2009.

\* cited by examiner

*Primary Examiner* — Cynthia H Kelly
*Assistant Examiner* — Chanceity N Robinson
(74) *Attorney, Agent, or Firm* — Sughrue Mion, PLLC

(57) ABSTRACT

An ink composition includes (A) a polymerization initiator; (B) an ester or amide of a mono-functional (meth)acrylic acid having an alkylene oxide repeating unit in a molecule; and (C) a colorant, and preferably further includes (E) a sensitizing dye.

14 Claims, No Drawings

INK COMPOSITION, INKJET RECORDING METHOD, PRODUCING METHOD OF PLANOGRAPHIC PRINTING PLATE, AND PLANOGRAPHIC PRINTING PLATE

CROSS-REFERENCE TO RELATED APPLICATION

This application claims priority under 35 USC 119 from Japanese Patent Applications Nos. 2005-380190, 2005-380193 and 2005-380194, the disclosures of which are incorporated by reference herein.

BACKGROUND OF THE INVENTION

1. Field of the Invention

The present invention relates to an ink composition suitably used for inkjet recording, an inkjet recoding method, and a planographic printing plate obtained with the ink, and a producing method of the planographic printing plate. In more detail, the invention relates to an ink composition suitable for inkjet recording, which can be cured with high sensitivity to irradiation of active radiation and has sufficient flexibility of a cured material even after the ink is cured, an inkjet recoding method, a planographic printing plate obtained with the ink, and a producing method of the planographic printing plate.

2. Description of the Related Art

As an image recording method that forms, based on an image signal, an image on a recording medium such as paper, an electrophotographic method, sublimation and fusion type thermal transfer methods and an inkjet method can be cited. In the electrophotographic method, since a process of charging and exposing to form an electrostatic latent image on a photoreceptor drum is necessary, a system therefor becomes complicated, resulting in a problem of higher production cost. As for the thermal transfer method, although a device is therefor cheap, since an ink ribbon is used, there are problems in that the running cost is high and waste is generated.

On the other hand, in the inkjet method, a cheap device can be used and the ink is discharged only on a necessary image portion to directly form an image on a recording medium. Accordingly, the ink can be used efficiently and the running cost is less expensive. Furthermore, the inkjet recording method, being lower in noise, is excellent as an image recording method.

As an ink composition that can be cured by irradiation of active radiation such as UV rays (radiation-curable ink composition) such as an inkjet recording ink composition, one that can be cured with high sensitivity and can form a high quality image is demanded. When high sensitivity is achieved, high curability due to irradiation of active radiation can be imparted. Accordingly, in addition to reduction of the power consumption and lengthening of the lifetime of an active radiation generator owing to lowering of burden, because sufficient curing can be achieved, there are various advantages in that an uncured low molecular weight material can be prevented from vaporizing and obtained image strength can be prevented from deteriorating. Furthermore, improvement in image strength owing to higher sensitivity yields a longer press life of an image portion when the ink composition is applied to form an image portion of a planographic printing plate.

As a UV-curable ink composition, for instance, an ink composition in which a plurality of monomers having different degrees of functionality are combined and used is proposed (for instance, JP-A-5-214280). However, in order to maintain the curing speed in such an ink composition, a polyfunctional monomer has to be used in a large amount, and in such a case, there is a problem with respect to the flexibility of an image after the ink is cured.

Furthermore, conventionally, when a planographic printing plate is prepared, a so-called PS plate that has a constitution in which a lipophilic photosensitive resin layer is disposed on a hydrophilic support is used, the photosensitive resin layer is imagewise exposed to increase or lower the solubility of an exposed portion to an alkali developer to form an image, and a non-image portion is dissolved and removed. However, in recent years, digital technology in which a computer is used to electronically process, store and output image information is in wide use. Accordingly, a new image output process corresponding thereto is in demand. In particular, a method that does not include processing with a developer to prepare a printing plate has been studied, and a process of directly preparing a planographic printing plate with an inkjet recording ink composition is under study. This is a process where, preferably, on a surface of a hydrophilic support, ink is imagewise discharged by means of an inkjet process, followed by irradiating active radiation thereto to carry out curing, whereby a printing plate having a desired image (preferably, a hydrophobic image) is obtained. In order to form an image portion of a planographic printing plate, it is desired that an ink drop discharged on the support is rapidly cured without causing bleeding, the strength of a cured image portion and the adhesiveness thereof with respect to the support are excellent, and when the planographic printing plate is mounted on a printing machine, the image portion excellently follows the deflection of the support and therefor is not subjected to damage such as cracks. An ink composition suitable for such applications is in demand.

An object of the invention is to provide an ink composition that can be cured with high sensitivity to irradiation of active radiation, form a high quality image, and impart sufficient flexibility to an image obtained after the ink is cured, and an inkjet recording method using the ink composition.

Furthermore, another object of the invention is to provide a planographic printing plate obtained using an ink composition that can be cured with high sensitivity when active radiation (particularly preferably UV rays) is irradiated, and a producing method of the planographic printing plate.

SUMMARY OF THE INVENTION

The present invention has been made in view of the above circumstances and provides an ink composition, an inkjet recording method, a method of producing a planographic printing plate and a planographic printing plate.

An aspect of the invention provides an ink composition comprising:

(A) a polymerization initiator;

(B) an ester or amide of a mono-functional (meth)acrylic acid having an alkylene oxide repeating unit in a molecule; and (C) a colorant.

Another aspect of the invention provides an ink composition comprising:

(A) a polymerization initiator;

(B) an ester or amide of a mono-functional (meth)acrylic acid having an alkylene oxide repeating unit in a molecule; and (C) a colorant, wherein a content of the (B) ester or amide of a mono-functional (meth)acrylic acid having an alkylene oxide repeating unit in a molecule is in the range of 1 to 18 mass percent with respect to a total mass of the ink composition.

Another aspect of the invention provides an ink composition comprising:
(A) a polymerization initiator;
(B) an ester or amide of a mono-functional (meth)acrylic acid having an alkylene oxide repeating unit in a molecule;
(B-2) an ester or amide of a mono-functional (meth)acrylic acid having an alkyl portion having 6 to 12 carbon atoms; and
(C) a colorant.

Another aspect of the invention provides an ink composition comprising:
(A) a polymerization initiator;
(B) an ester or amide of a mono-functional (meth)acrylic acid having an alkylene oxide repeating unit in a molecule;
(B-3) polyfunctional (meth)acrylate having a weight average molecular weight of less than 360; and
(C) a colorant.

DETAILED DESCRIPTION OF THE INVENTION

The present inventors, after studying hard, found that when a particular polymerizing compound is used in an ink composition, an ink composition where, while maintaining high sensitivity, the flexibility after the ink is cured is improved and the adhesiveness to a recording medium is heightened can be obtained, and came to completion of the invention.

Although an action mechanism of the invention is not clear, it is assumed as follows.

In the invention, as a polymerizing compound, (B) an ester or amide of a mono-functional (meth)acrylic acid having an alkylene oxide repeating unit in a molecule (hereinafter, in some cases, referred to as "particular polymerizing compound") is used. It is considered that when the polymerizing compound is used, a ratio of an oxygen atom that is a polar atom is increased in the ink composition to lower the permeability of oxygen that is a matter detrimental to a radical polymerization and deactivation due to a recombination of generated active species (radical) is inhibited from occurring, resulting in improving a curing speed.

Furthermore, in the ink composition, the particular polymerizing compound, between polyalkylene oxide groups due to repeating units of alkylene oxide, forms a weak interaction at many points. The existence of the interaction is as well assumed contributing to an improvement in the curing speed.

The interaction like this is not strong as a covalent bond formed when polyfunctional acrylate is cured; accordingly, a film after the curing reaction is advantageous in the flexibility in comparison with a case where the curability is improved with polyfunctional acrylate.

From these, it is assumed that an improvement in the curing speed and endowment of the flexibility can be preferably combined.

In a first embodiment of the invention, a blending ratio of the particular polymerizing compound in the ink composition does not exceed substantially 18 mass percent. When the particular polymerizing compound is used much (for instance, 20 mass percent or more), owing to the lowness of the softening point of the particular polymerizing compound, the stickiness is caused to a cured film, and, though depending on kinds of other monomers that are combined, in some cases, a high reaction rate deteriorates the physical property of film. In this connection, when considering the suppression of the stickiness of the cured film and the degree of freedom in designing of the ink composition, a blending ratio of the particular polymerizing compound in the ink composition preferably does not exceed substantially 18 mass percent.

In a second embodiment of the invention, the particular polymerizing compound is used together with (B-2) an ester or amide of a mono-functional (meth)acrylic acid having an alkyl portion having 6 through 12 carbon atoms. When an ester of a mono-functional (meth)acrylic acid having an alkylene oxide repeating unit that is the particular polymerizing compound is used, an improvement in the curing speed and the flexibility of a film after a curing reaction can be preferably combined. However, on the other hand, when the (B) ester or amide of a mono-functional (meth)acrylic acid having an alkylene oxide repeating unit is used as a polymerizing compound, since a curing reaction may proceed excessively, in some cases, the flexibility of a cured film is deteriorated. In the second embodiment of the invention, in order to inhibit the flexibility from deteriorating, (B-2) an ester or amide of a mono-functional (meth)acrylic acid having an alkyl portion having 6 through 12 carbon atoms is further used together. When two kinds of polymerizing compounds involving the embodiment are used together, the curing speed and the flexibility of a cured film can be preferably combined. This is considered that a balance between the compatibility between the (B-2) component and the components such as the polymerization initiator, the hydrophilicity or hydrophobicity of the polymerizing compound itself and highness and lowness of the softening point is considered affecting thereon.

In a third embodiment of the invention, the particular polymerizing compound is used together with (B-3) polyflnctional (meth)acrylate having a weight average molecular weight of less than 360. When (B) an ester of a mono-functional (meth)acrylic acid having an alkylene oxide repeating unit that is a particular polymerizing compound is used, an improvement in the curing speed and the flexibility of a cured film can be preferably combined. However, on the other hand, when only the (B) particular polymerizing compound is used as a polymerizing compound, owing to the lowness of the softening point of the polymerizing compound, yet a curing reaction is sufficiently forwarded, in some cases, the stickiness after the reaction causes a problem. In the third embodiment involving the invention, in order to inhibit such the stickiness from occurring, the (B-3) component is further used together. When such two kinds of polymerizing compounds are used together, without adversely affecting on the curing speed and the flexibility of the cured film, the stickiness after the curing can be suppressed. This is considered that the compatibility of the (B-3) component and the components such as the polymerization initiator and a degree of the hydrophilicity or hydrophobicity of the polymerizing compound itself are considered affecting thereon.

In the ink composition, as a polyfunctional polymerizing compound, oligomer compounds having a high molecular weight typical in epoxy acrylate oligomer, urethane acrylate oligomer and polyester acrylate oligomer can be used. However, there are problems in that the stickiness has to be inhibited and the inkjet aptitude is poor; accordingly, the oligomer compounds are not preferable to use.

When a colored image is formed with the ink composition, a colorant may be further added.

The ink composition according to the invention can be cured at high sensitivity under irradiation of radiation and can improve the flexibility of a film formed on an ink surface as well; accordingly, the ink composition can be preferably used for inkjet recording.

Furthermore, an inkjet recording method according to the invention includes:
(a) discharging an ink composition according to the invention on a recording medium; and
(b) irradiating active radiation on the discharged ink composition to cure the ink composition.

A producing method of a planographic printing plate according to the invention includes:

(a') discharging an ink composition according to the invention on a hydrophilic support; and (b') irradiating active radiation on the discharged ink composition to cure the ink composition to form a hydrophobic image formed by curing the ink composition on the hydrophilic support.

The planographic printing plate according to the invention is produced according to the producing method according to the invention of a planographic printing plate.

As described above, according to the invention, an ink composition that can be cured at high sensitivity to illumination of active radiation, can form a high quality image and has sufficient flexibility of an image obtained after the ink is cured, and an inkjet recoding method with the ink composition can be provided.

Furthermore, the invention can provide a planographic printing plate obtained with the ink composition that can be cured at high sensitivity to illumination of active radiation (particularly preferably UV-ray), and a producing method of the planographic printing plate.

<Ink Composition>

An ink composition according to the invention includes:

(A) a polymerization initiator;

(B) an ester or amide of a mono-functional (meth)acrylic acid having an alkylene oxide repeating unit in a molecule; and (C) a colorant.

The ink composition according to the invention can be preferably used for inkjet recording.

In what follows, indispensable components of the ink composition of the invention will be sequentially described.

[(B) Ester or Amide of a Mono-functional (Meth)acrylic acid having an Alkylene Oxide Repeating Unit in a Molecule (particular polymerizing compound)]

The ink composition according to the invention includes a (B) particular polymerizing compound [hereinafter, in some cases, referred to as (B) component].

Here, an (B) ester or amide of a mono-functional (meth) acrylic acid having an alkylene oxide repeating unit in a molecule, when it has a polyalkylene oxide chain with alkylene oxide as a repeating unit and one of structures derived from (meth)acrylic acid, can be preferably used.

As the particular polymerizing compounds in the invention, compounds shown by a formula (I) below can be preferably cited.

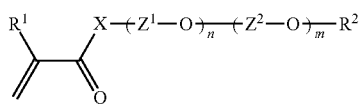

Formula (I)

In the formula (I), $R^1$ denotes a hydrogen atom or a methyl group, from viewpoints of the reactivity and the flexibility of a polymer generated via a polymerization reaction, a hydrogen atom being preferable. X denotes an oxygen atom or NR', from viewpoints of improving the mobility in the periphery of a polymerizing site, an oxygen atom being preferable. Here, R' denotes a hydrogen atom or an alkyl group, is preferably a hydrogen atom or an alkyl group having 1 through 4 carbon atoms and is more preferably a hydrogen atom.

$Z^1$ and $Z^2$, respectively and independently, denote an alkylene group having 1 through 6 carbon atoms, alkylene groups having 2 through 4 carbon atoms such as an ethylene group, a propylene group (linear or branched) or a butylene group (linear or branched) being preferable, and an ethylene group or a propylene group (linear or branched) being more preferable. Furthermore, any one of the $Z^1$ and $Z^2$ is particularly preferably an ethylene group.

n is an integer from 1 to 80, and m is an integer from 0 to 80. Furthermore, n is preferably an integer from 2 to 25 and m is preferably an integer from 0 to 25, and both n and m are more preferably an integer from 3 to 10. When m is an integer of 1 or more, $Z^1$ and $Z^2$ are not the same. When m and n are 1 or more and m+n is 3 or more, a repeating mode of ($Z^1$—O) and ($Z^2$—O) may be random or in block.

$R^2$ denotes a hydrogen atom or a mono-valent organic group, and, as the organic group, ones having 1 to 20 carbon atoms are preferable. Among these, a hydrogen atom, an alkyl group having 1 to 18 carbon atoms and an aryl group having 6 to 10 carbon atoms are preferable, and the aryl group may be further substituted by an alkyl group with 1 to 10 carbon atoms. In particular, $R^2$, from the inkjet aptitude of the ink composition, is preferably an alkyl group having 1 to 18 carbon atoms and more preferably an alkyl group having 1 to 8 carbon atoms, a methyl group being cited as the most preferable alkyl group.

Specific examples [(B-1) through (B-21)] of the particular polymerizing compound that can be used in the invention will be shown below. However, the invention is not restricted thereto.

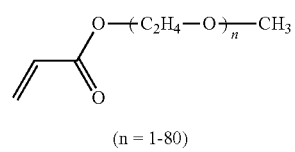

B-1

(n = 1-80)

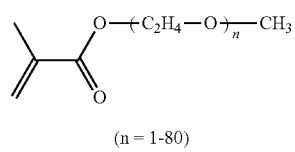

B-2

(n = 1-80)

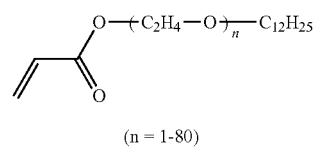

B-3

(n = 1-80)

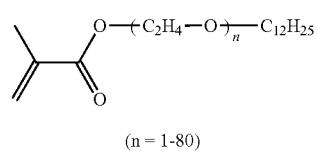

B-4

(n = 1-80)

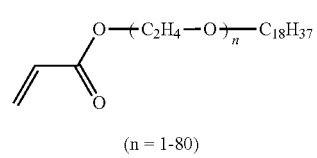

B-5

(n = 1-80)

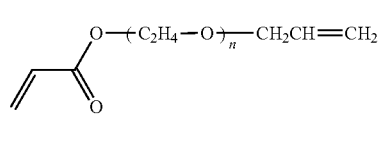

B-6

(n = 1-80)

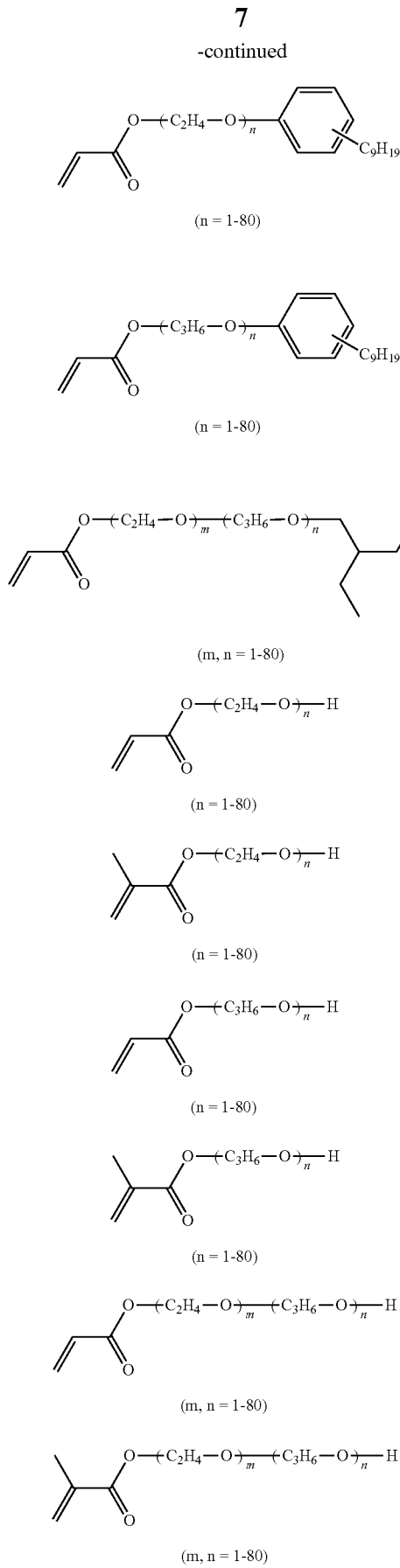
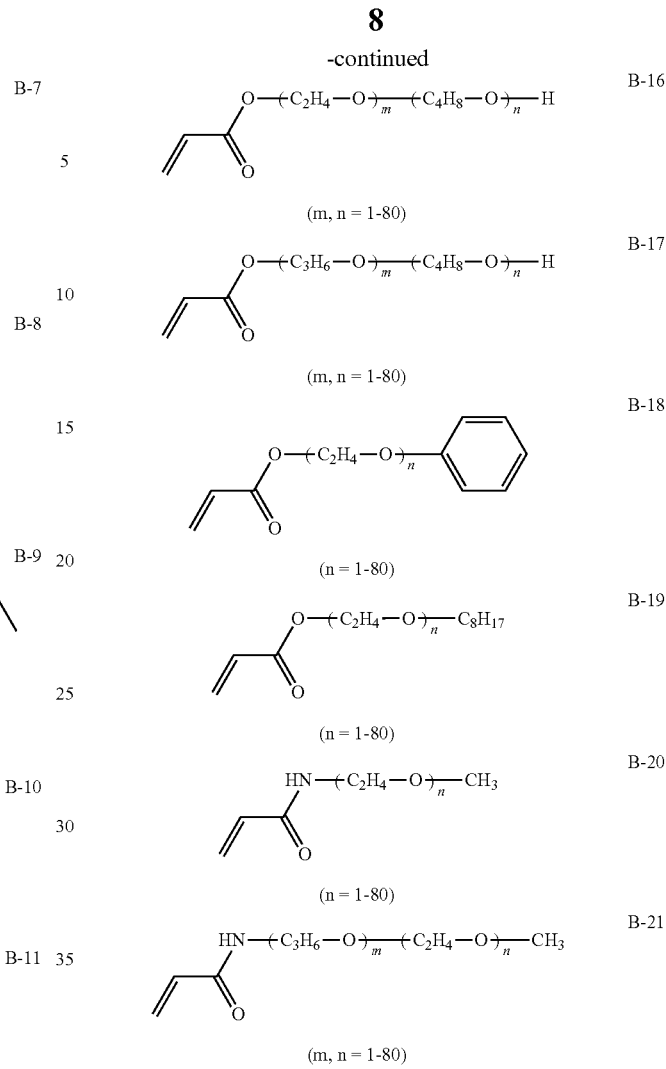

In the first embodiment of the invention, a content of the (B) particular polymerizing compound in the ink composition, from a viewpoint of a balance between the curing speed and the flexibility and the inkjet aptitude of the ink composition, is used in the range of 1 to 18 mass percent to a mass of an entire ink composition, preferably in the range of 2 to 15 mass percent and more preferably in the range of 3 to 12 mass percent.

When a content of the particular polymerizing compound exceeds 18 mass percent, in some cases, the stickiness and the deterioration of flexibility of a cured film are caused, on the other hand, when it is less than 1 mass percent, in some cases, an improvement in the curing speed cannot be obtained.

Furthermore, the particular polymerizing compounds may be used singularly or in a combination of two or more kinds thereof.

In the second embodiment of the invention, in the particular polymerizing compound, an (B-2) ester or amide of a mono-functional (meth)acrylic acid having an alkyl portion having 6 through 12 carbon atoms is used together.

In the second embodiment of the invention, a content of the (B) particular polymerizing compound in the ink composition, from a viewpoint of a balance between the curing speed and the flexibility and the inkjet aptitude of the ink composition, is set in the range of 3 to 50 mass percent to a mass of an entire ink composition, preferably in the range of 5 to 40 mass percent and more preferably in the range of 10 to 35 mass percent.

When a content of the (B) component exceeds 50 mass percent, in some cases, the stickiness of a cured film and deterioration of the flexibility thereof are caused, on the other hand, when it is less than 1 mass percent, in some cases, an improvement in the curing speed cannot be obtained.

Furthermore, the (B) components may be used singularly or in a combination of two or more kinds.

[(B-2) Ester or Amide of a Mono-functional (meth)acrylic Acid having an Alkyl Portion having 6 through 12 Carbon Atoms]

An ink composition according to the second embodiment of the invention contains, together with the (B) component, an (B-2) ester or amide of a mono-functional (meth)acrylic acid having an alkyl portion having 6 through 12 carbon atoms [hereinafter, appropriately referred to as a (B-2) component].

In what follows, the (B-2) component will be described.

The (B-2) component in the invention, as far as it is an ester between alcohol having an alkyl portion having 6 to 12 carbon atoms and (meth)acrylic acid or an amide between amine having an alkyl portion having 6 to 12 carbon atoms and (meth)acrylic acid, can be preferably used.

Now, the alkyl portion in the (B-2) component means an entirety of an alkyl group directly connected with an oxygen atom of an ester bond portion or a nitrogen atom of an amide bond portion. That is, when a plurality of the alkyl groups is contained, an entirety of the plurality of alkyl groups corresponds to an alkyl portion in the (B-2) component and a sum total of the number of carbon atoms contained in such the alkyl groups is necessarily 6 to 12. For instance, when two alkyl groups are amides directly connected to a nitrogen atom of an amide bond portion, a sum total of the number of carbon atoms contained in the two alkyl groups is necessarily 6 to 12.

Examples of alcohols having an alkyl portion having 6 to 12 carbon atoms include alcohols having a linear alkyl group such as n-hexanol, n-heptanol, n-octanol, n-nonanol, n-decanol, n-undecanol and n-dodecanol, and branched alcohols such as 2-ethyl hexanol and isooctyl alcohol.

Examples of amines having an alkyl portion having 6 to 12 carbon atoms include primary amines having a linear alkyl group such as n-hexylamine, n-heptylamine, n-octylamine, n-nonylamine, n-decylamine, n-undecylamine and n-dodecylamine, primary amines having branched alkyl group such as 2-ethylhexylamine and t-octylamine and secondary amines such as dipropylamine, diisopropylamine, dibutylamine and dihexylamine.

The (B-2) component, from a viewpoint of the inkjet aptitude and the compatibility in the composition, is preferably an ester or amide of mono-functional (meth)acrylic acid having an alkyl portion having 6 to 12 carbon atoms.

An alkyl portion forming an ester or an amide is an alkyl group having 6 to 12 carbon atoms. From a viewpoint of an affect on the flexibility after the curing, a linear alkyl group is preferable. As the number of carbon atoms of the alkyl group, 8 to 12 is more preferable and 8 to 10 is particularly preferable. When the number of carbon atoms of the alkyl group is less than 6, the flexibility after the curing cannot be sufficiently exerted and odor is problematic as well. Furthermore, when the number of carbon atoms of the alkyl group exceeds 12, the compatibility in the composition is lowered to result in deteriorating the stability of the composition and flexibility after the curing.

Specific examples [(B-2-1) to (B-2-13)] of the (B-2) component that can be preferably used in the invention are shown below. However, the invention is not restricted thereto.

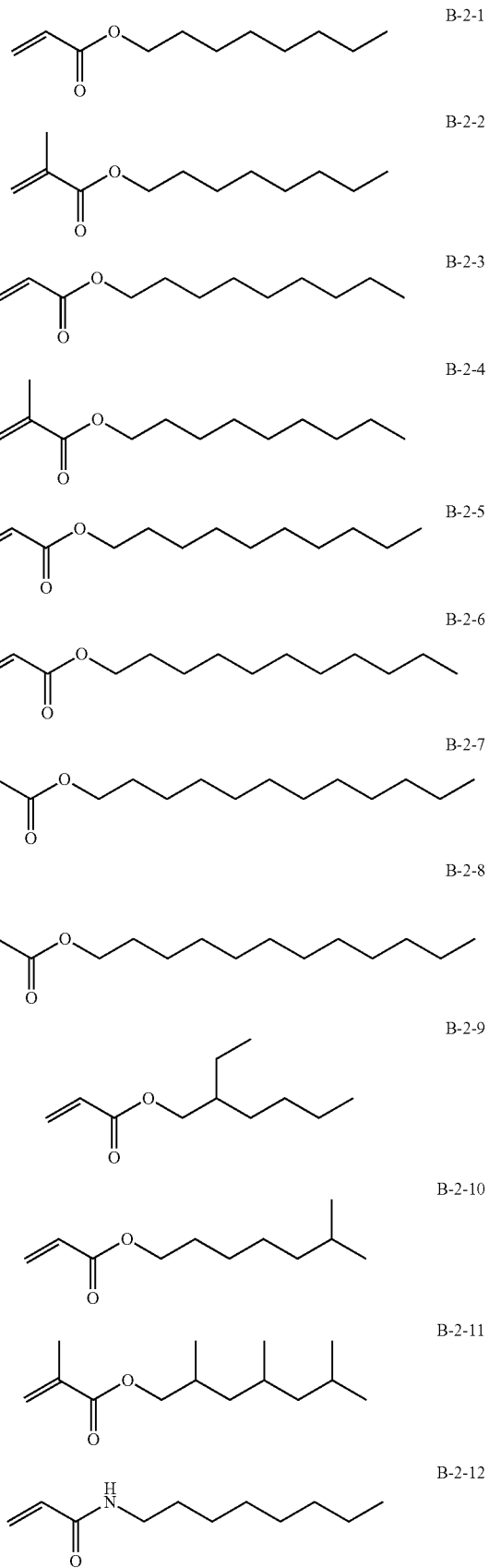

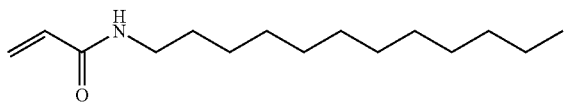

Furthermore, the (B-2) components may be used singularly or in a combination of two or more kinds. However, a mode where two or three kinds thereof are mixed and used is preferable. A mode where two or three kinds of esters of mono-functional (meth)acrylic acid having an alkyl group having 8 to 10 carbon atoms are used together can be particularly preferably cited.

A content of the (B-2) component in the ink composition of the invention, from a viewpoint of a balance between the curing speed and the flexibility and the inkjet aptitude of the ink composition, is, to a mass of an entire ink composition, preferably in the range of 2 to 50 mass percent, more preferably in the range of 5 to 40 mass percent and particularly preferably in the range of 10 to 35 mass percent. When the content of the (B-2) component exceeds 50 mass percent, the curing speed is drastically lowered. On the other hand, when it is less than 2 mass percent, an advantage of improving the flexibility after the curing cannot be exerted.

Furthermore, from the viewpoint of preferably combining the curing speed and the flexibility of the cured film, a content ratio (mass ratio) of the (B) component and the (B-2) component in the ink composition is preferably in the range of (B):(B-2)=20:80 to 70:30 and more preferably in the range of 30:70 to 65:35.

In a description below of the second embodiment, in some cases, the (B) component and the (B-2) component are generically called as the (B) component.

In a third embodiment of the invention, in the particular polymerizing compound, polyfunctional (meth)acrylate having a weight average molecular weight of less than 360 is used together.

In the third embodiment of the invention, a content of the (B) particular polymerizing compound in the ink composition, from a viewpoint of a balance between the curing speed and the flexibility and the inkjet aptitude of the ink composition, is set at, to a mass of an entire ink composition, preferably in the range of 3 to 50 mass percent, more preferably in the range of 5 to 40 mass percent and particularly preferably in the range of 10 to 35 mass percent. When the content of the (B) component exceeds 50 mass percent, in some cases, the stickiness of a cured film is caused and the flexibility thereof is deteriorated, on the other hand, when it is less than 1 mass percent, in some cases, an improvement in the curing speed cannot be obtained.

Furthermore, the (B) components may be used singularly or in a combination of two or more kinds thereof.

[(B-3) Polyfunctional (Meth)acrylate having a Weight Average Molecular Weight of less than 360]

The ink composition according to the third embodiment of the invention contains, together with the (B) component, (B-3) polyfunctional (meth)acrylate having a weight average molecular weight of less than 360.

As the (B-3) component in the invention, any polyfunctional acrylate compounds having a weight average molecular weight of less than 360 can be preferably used.

A weight average molecular weight of a polyfunctional (meth)acrylate (hereinafter, in some cases, simply referred to as "molecular weight") is necessarily less than 360. However, from a viewpoint of a balance between the curability and the flexibility after curing, it is preferably less than 310 and more preferably less than 290. The lower limit of the molecular weight is necessarily a molecular weight capable of having two or more acrylate structures, and, from a viewpoint of the flexibility after curing, it is preferably larger than 170 and more preferably larger than 210.

Here, a weight average molecular weight in the invention, when the (B-3) component is a single compound or a mixture containing a particular main component, means a molecular weight of the single component or the main component. When the (B-3) component is a mixture of many kinds of components, the weight average molecular weight thereof means a molecular weight obtained in terms of a reference material such as polystyrene in the gel-permeation chromatography (GPC).

The number of (meth)acrylate groups that the polyfunctional (meth)acrylate has, from a viewpoint of the curability, may be two or more, is preferably 2 to 4 and more preferably 2 to 3, and polyfunctional (meth)acrylate having two (meth)acrylate groups (that is, bifunctional (meth)acrylate) is particularly preferable.

A polymerizing group in the polyfunctional (meth)acrylate group may be any one of an acrylate group and a methacrylate group, only one of an acrylate group and a methacrylate group or both of an acrylate group and a methacrylate group. From a viewpoint of the physical property of a cured film and the curing speed of the ink composition, the acrylate group is preferably contained at least one and all polymerizing groups present in a molecule are particularly preferably acrylate groups.

As the (B-3) component in the invention, compounds shown by a formula (II) below can be cited as preferable ones.

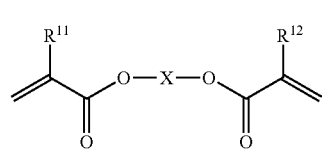

Formula (II)

In the formula (II), $R^{11}$ and $R^{12}$, respectively and independently, denote a hydrogen atom or a methyl group, a methyl group being more preferable.

X denotes a divalent organic group, an alkylene group having a linear, branched or cyclic structure being preferable, an alkylene group having an ether structure where a methylene group (—$CH_2$—) in an alkylene group is substituted by an oxygen atom being more preferable. The alkylene group may further have a substitution group, for instance, a hydroxy group, an alkoxy group having 1 to 4 carbon atoms and a halogen atom can be cited.

The number of atoms constituting a main skeleton of X is preferably 3 to 16 and more preferably 5 to 16. Here, [a main skeleton of X] indicates an atom group that is used only for linking (meth)acrylate groups that bond at both ends in X. When there is a plurality of linking paths between X and (meth)acrylate groups at both ends, the [main skeleton of X] indicates a path that is least in the number of used atoms. Specific examples [(B-3-1) through (B-3-28)] of the (B-3) component that can be preferably used in the invention will be shown below. However, the invention is not restricted thereto.

(B-3-1)
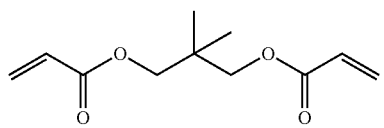
Mol. Wt.: 212.24
(B-3-2)
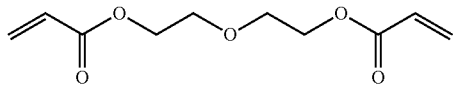
Mol. Wt.: 214.22
(B-3-3)
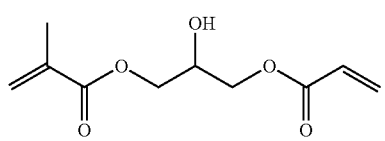
Mol. Wt.: 214.22
(B-3-4)
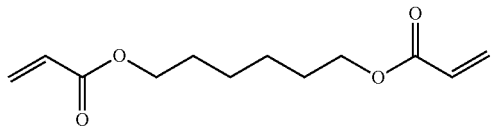
Mol. Wt.: 226.27
(B-3-5)
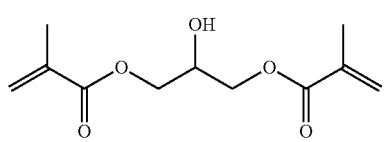
Mol. Wt.: 228.24
(B-3-6)
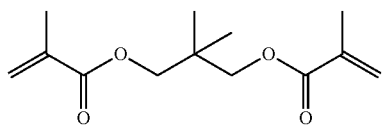
Mol. Wt.: 240.30
(B-3-7)
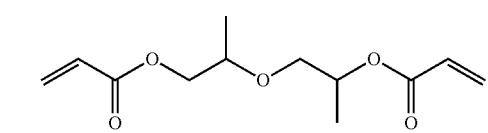
Mol. Wt.: 242.27
※ A propylene oxide repeating unit expresses a mixture of isomers.
(B-3-8)
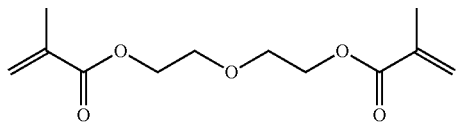
Mol. Wt.: 242.27
(B-3-9)
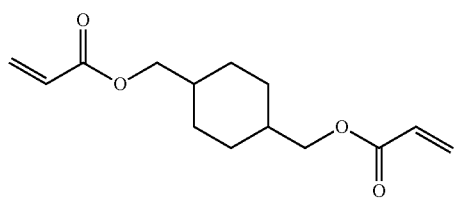
Mol. Wt.: 252.31
(B-3-10)
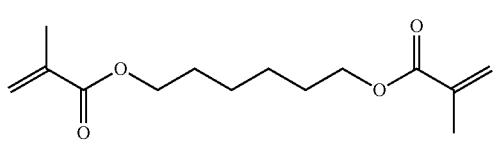
Mol. Wt.: 254.32
(B-3-11)
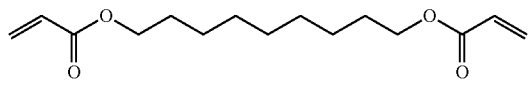
Mol. Wt.: 268.35
(B-3-12)
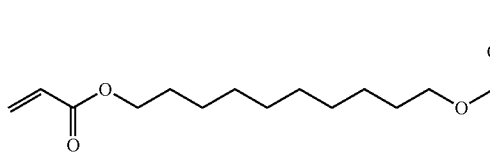
Mol. Wt.: 282.38
(B-3-13)
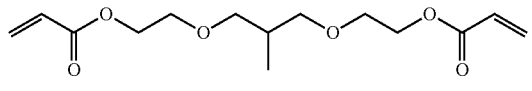
Mol. Wt.: 286.32
(B-3-14)
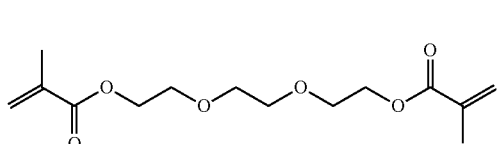
Mol. Wt.: 286.32

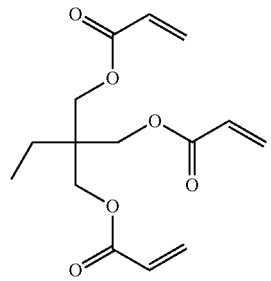
Mol. Wt.: 296.32
(B-3-15)
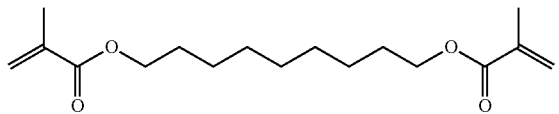
Mol. Wt.: 296.40
(B-3-16)
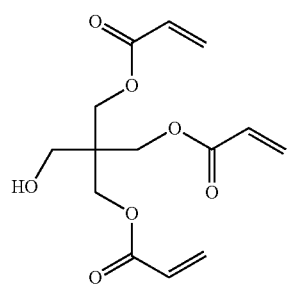
Mol. Wt.: 298.29
(B-3-17)
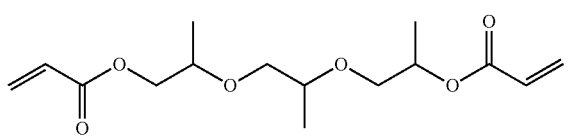
Mol. Wt.: 300.35
※ A propylene oxide repeating unit expresses a mixture of isomers.
(B-3-18)
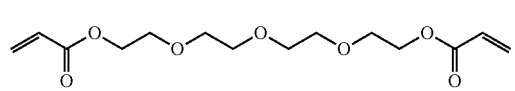
Mol. Wt.: 302.32
(B-3-19)
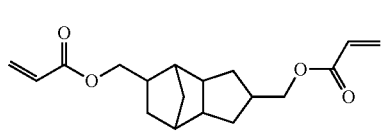
Mol. Wt.: 304.38
※ This includes isomers different in substitution position on a tricyclo ring.
(B-3-20)
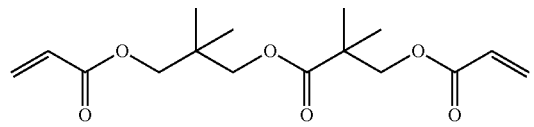
Mol. Wt.: 312.36
(B-3-21)
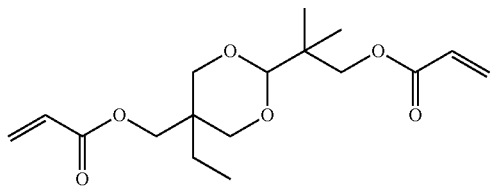
Mol. Wt.: 326.38
(B-3-22)
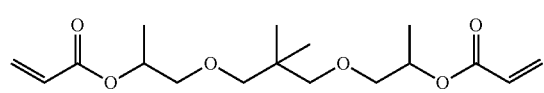
Mol. Wt.: 328.40
※ A propylene oxide unit includes a mixture of isomers.
(B-3-23)
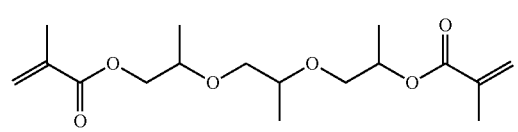
Mol. Wt.: 328.40
※ A propylene oxide unit includes a mixture of isomers.
(B-3-24)

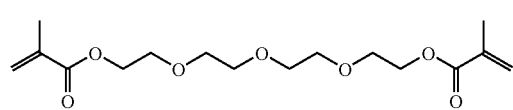

(B-3-25)

Mol. Wt.: 330.37

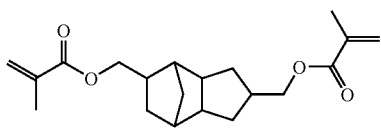

(B-3-26)

Mol. Wt.: 304.38

※ This includes isomers different in substitution position on a tricyclo ring.

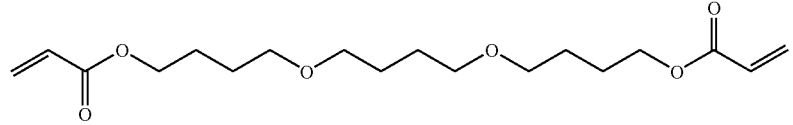

(B-3-27)

Mol. Wt.: 342.43

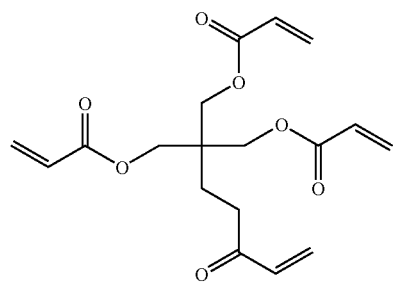

(B-3-28)

Mol. Wt.: 352.34

A content of the (B-3) component in the ink composition of the invention is, from a viewpoint of a balance between the curing speed and the flexibility and the inkjet aptitude of the ink composition, to a mass of an entire ink composition, preferably in the range of 5 to 75 mass percent, more preferably in the range of 7 to 70 mass percent and particularly preferably in the range of 10 to 65 mass percent.

When a content of the (B-3) component exceeds 75 mass percent, the physical property of film such as the flexibility after the curing and the adhesiveness with a substrate are deteriorated. On the other hand, when it is less than 5 mass percent, the curability is observed deteriorated.

Furthermore, the (B-3) components may be used singularly or in a combination of two or more kinds. However, a mode where two or three kinds are mixed and used can be cited as a preferable mode.

A content ratio (mass ratio) of the (B) component and the (B-3) component is preferably in the range of 5:95 through 50:50, more preferably in the range of 7:93 through 40:60 and particularly preferably in the range of 10:90 through 30:70.

In a description below of the third embodiment, in some cases, the (B) component and the (B-3) component are generically called as (B) component.

[(A) Polymerization Initiator]

The ink composition of the invention contains a polymerization initiator. As the polymerization initiator, known polymerization initiators can be used. In the invention, a radical polymerization initiator can be preferably used.

The polymerization initiator used in the ink composition of the invention is a compound that absorbs external energy to generate a polymerization initiation seed. The external energy used to initiate a polymerization reaction is roughly divided into heat and radiation, and a thermal polymerization initiator and a photopolymerization initiator are used, respectively. As the radiation, γ-rays, β-rays, electron beam, UV-rays, visible rays and IR-rays can be exemplified.

As the thermal polymerization initiator and the photopolymerization initiator, known compounds can be used.

Examples of the radical polymerization initiators that can be used in the invention include (a) aromatic ketones, (b) an acylphosphine compound or acylphosphine oxide compound, (c) an aromatic onium salt compound, (d) an organic peroxide, (e) a thio compound, (f) a hexaarylbiimidazole compound, (g) a ketooxime ester compound, (h) a borate compound, (i) an azinium compound, (j) a metallocene compound, (k) an active ester compound, (l) a compounds having a carbon halogen bond and (m) an alkylamine compound.

The radical polymerization initiators in the invention may be used singularly or in a combination of two or more kinds.

The (A) polymerization initiator in the invention is contained, to a total mass of the (B) component (in the case of the second embodiment, (B-2) component is contained, and in the case of the third embodiment, the (B-3) component is contained), or, when the (B) component and (D) other polymerizable compound as an optional component are used together, to a total mass of the polymerizing compound, preferably in the range of 0.01 to 35 mass percent, more preferably in the range of 0.1 to 30 mass percent and still more preferably in the range of 0.5 to 30 mass percent.

Furthermore, the (A) polymerization initiator is contained, to a (E) sensitizing dye that is described below and can be used as needs arise, in a mass ratio of polymerization initiator: sensitizing dye, in the range of 200:1 to 1:200, preferably in the range of 50:1 to 1:50 and more preferably in the range of 20:1 to 1:5.

[(C) Colorant]

The ink composition according to the invention contains a (C) colorant.

As the colorant that can be used in the invention is not particularly restricted. However, a (C-1) pigment and (C-2) oil-soluble dye excellent in the weather resistance and rich in the color reproducibility are preferable. An arbitrary known colorant such as a dissolvable dye can be selected and used. As the colorant that can be preferably used in the ink composition according to the invention, from viewpoint of not lowering the sensitivity to a curing reaction owing to active radiation, a compound that does not work as a polymerization inhibitor in the polymerization reaction that is a curing reaction is preferable.

(C-1) Pigment

As the pigment that can be used in the invention, though not particularly restricted, organic or inorganic pigments having numbers below described in, for instance, color index can be used.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257; Pigment Violet 3, 19, 23, 29, 30, 37, 50 and 88; and Pigment Orange 13, 16, 20 and 36.

Examples of blue or cyan pigments include Pigment Blue 1, 15, 15:1, 15:2, 15:3, 15:4, 15:6, 16, 17-1, 22, 27,28, 29, 36 and 60.

Examples of green pigments include Pigment Green 7, 26, 36 and 50.

Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of black pigments include Pigment Black 7, 28 and 26.

Examples of white pigments include Pigment White 6, 18 and 21.

The pigments can be used depending on applications.

(C-2) Oil-Soluble Dye

In what follows, an oil-soluble dye that can be used in the invention will be described.

The oil-soluble dye that can be used in the invention means a substantially water-insoluble dye. Specifically, the oil-soluble dye indicates one of which solubility in water at 25° C. (a mass of a dye that can be dissolved in 100 g water) is 1 g or less, preferably 0.5 g or less and more preferably 0.1 g or less. Accordingly, the oil-soluble dye means a so-called water-insoluble pigment and oil-soluble dye. Among these, the oil-soluble dyes are preferable.

Among the oil-soluble dyes that can be used in the invention, as a yellow dye, an arbitrary one can be used. Examples thereof include an aryl or heteryl azo dye having, for instance, phenols, naphthols, anilines, pyrazolones, pyridones or open-chain active methylene compounds as a coupling component; an azomethine dye having, for instance, open-chain active methylene compounds as the coupling component; a methine dye such as a benzylidene dye or a monomethine oxonol dye; a quinone dye such as a naphthoquinone dye or an anthraquinone dye; and, as other dye species, a quinophtharone dye, a nitro and nitroso dye, a acridine dye, or an acridinone dye.

Among the oil-soluble dyes that can be used in the invention, as the magenta dye, an arbitrary one can be used. Examples of the magenta dyes include an aryl or heteryl azo dye having, for instance, phenols, naphthols or anilines as a coupling component; an azomethine dye having, for instance, pyrazolones or pyrazolotriazoles as a coupling component; a methine dye such as an arylidene dye, styryl dye, merocyanine dye or oxonol dye; a carbonium dye such as a diphenylmethane dye, a triphenylmethane dye or a xanthene dye; a quinone dye such as naphthoquinone, anthraquinone or anthrapyridone; and a condensed polycyclic dye such as a dioxazine dye.

Among the oil-soluble dyes that can be used in the invention, as the cyan dye, an arbitrary one can be used. Examples of the cyan dyes include an indoaniline dye; an indophenol dye; an azomethine dyes having pyrolotriazoles as a coupling component; a polymethine dye such as a cyanine dye, an oxonol dye or a merocyanine dye; a carbonium dye such as a diphenylmethane dye, a triphenylmethane dye or a xanthene dye; a phthalocyanine dye; an anthraquinone dye; an aryl or heteryl azo dye having, for instance, phenols, naphthols or anilines as the coupling component; and an indigo and thioindigo dye.

Each of the dyes may be one that develop a color such as yellow, magenta or cyan only when a chromophore is partialy dissociated; and in such a case, a counter cation may be an inorganic cation such as an alkali metal or ammonium, an organic cation such as pyridinium or quaternary ammonium salt, or a cationic polymer having the above a partial structure.

Though not restricted to following ones, preferable specific examples include C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

Particularly preferable ones among them include Nubian Black PC-0850, Oil Black HBB, Oil Yellow 129, Oil Yellow 105, Oil Pink 312, Oil Red 5B, Oil Scarlet 308, Vali Fast Blue 2606, and Oil Blue BOS (manufactured by Orient Chemical Industries); Aizen Spilon Blue GNH (manufactured by Hodogaya Chemical Co., Ltd.); Neopen Yellow 075, Neopen Magenta SE1378, Neopen Blue 808, Neopen Blue FF4012, and Neopen Cyan FF4238 (manufactured by BASF).

In the invention, the oil-soluble dyes may be used singularly or in a combination of a plurality of kinds.

Furthermore, when the oil-soluble dye is used as a colorant, within an extent that does not disturb the advantages of the invention, as needs arise, a colorant such as other water-soluble dye, a disperse dye or a pigment can be used together.

In the invention, a disperse dye may be used as well in such an amount that can be dissolved in a water-immiscible organic solvent. The disperse dye generally includes a water-soluble dye. However, in the invention, the disperse dye is preferably used within a range that can be dissolved in a water-immiscible organic solvent. Preferable specific examples of the disperse dyes include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

The colorant that can be used in the invention is, after added to the ink composition of the invention, preferably suitably dispersed in the ink composition. When the colorant is dispersed, various kinds of dispersers such as a ball mill, sand mill, attritor, roll mill, agitator, Henshel mixer, colloid mill, supersonic homogenizer, pearl mill, wet jet mill and paint shaker can be used.

Furthermore, when the colorant is dispersed, a dispersant can be added. The dispersant is not particularly restricted in the kind. However, a polymer dispersant can be preferably used. As the polymer dispersant, for instance, Solsperse series (trade name, produced by Noveon Corp.) can be cited. Still furthermore, as a dispersion aide, a synergist corresponding to each of the pigments can be used. In the invention, the dispersant and dispersing aide are preferably added from 1 to 50 parts by weight based on 100 parts of the colorant.

The colorant may be directly added to and blended with the ink composition of the present invention together with respective components at the preparation of the ink composition. However, in order to improve the dispersibility, they may be previously added to a dispersing medium such as a solvent or the (B) component used in the invention or (D) other polymerizable compound used together as needs arise to uniformly disperse or dissolve, followed by blending.

In the invention, in order to avoid problems of the deterioration of the solvent resistance when the solvent remains in the cured image and the VOC (Volatile Organic Compound) of the remaining solvent, the colorant is preferably previously added to any one of the polymerizable compounds including the (B) component or a mixture thereof to blend. Moreover, when a viewpoint of the dispersion aptitude alone is considered, as the polymerizing compound used to add the colorant, monomers with the lowest viscosity are preferably selected.

The colorants, depending on the applications of the ink composition, can be appropriately selected to use singularly or in a combination thereof.

When a colorant such as a pigment that remains as solid in the ink composition of the invention is used, in order that an average particle size of colorant particle may be, for the first embodiment, preferably in the range of 0.005 to 0.5 µm, more preferably in the range of 0.01 to 0.45 tom and still more preferably in the range of 0.015 to 0.4 µm, for the second embodiment, preferably in the range of 0.005 to 1.5 µm, more preferably in the range of 0.01 to 1.2 µm and still more preferably in the range of 0.015 to 1.0 µm, and, for the third embodiment, preferably in the range of 0.005 to 1.5 µm, more preferably in the range of 0.01 to 1.2 µm and still more preferably in the range of 0.015 to 1.0 µm, it is preferable that the colorant, dispersant and dispersion medium are selected and dispersion conditions and filtering conditions are set. When the particle size is thus managed, a head nozzle can be inhibited from clogging, and the storage stability-of ink, the transparency of ink and the curing sensitivity of ink can be maintained.

A content of the colorant in the ink composition of the invention is appropriately selected depending on applications thereof. However, when the ink physical property and the coloring property are considered, in general, the content of the colorant to a mass of an entire ink composition is preferably set in the range of 1 to 10 mass percent and more preferably in the range of 2 to 8 mass percent.

In the ink composition according to the invention, in addition to the above indispensable components, as far as it does not disturb advantages of the invention, in order to improve the physical property, other components can be used together.

In what follows, the arbitrary components will be described.

[(D) Other Polymerizing Compounds]

In the ink composition of the invention, in addition to the (B) component, (D) other polymerizing compounds can be preferably contained. As the other polymerizing compounds that can be used in the invention, radical polymerizing compounds and cationic polymerizing compounds can be cited.

The (D) other polymerizing compound may be appropriately selected and used in connection with intended various characteristics, or the (A) polymerization initiator.

In the first embodiment of the invention, a total content of the polymerizing compounds, that is, a sum total of addition amounts of the (B) component and the (D) other polymerizing compound that can be used together therewith is, to a mass of an entire ink composition of the invention, preferably in the range of 6 to 55 mass percent and more preferably in the range of 10 to 45 mass percent.

Furthermore, in the ink composition according to the first embodiment of the invention, the content of the (B) component is set at, to a total content of the polymerizing compounds contained in the ink composition (that is, a total content of the (B) component and the (D) component), preferably 10 mass percent or more, more preferably 15 mass percent or more, still more preferably 20 mass percent or more and particularly preferably 30 mass percent or more.

In the second embodiment of the invention, a sum total of contents of the polymerizing compounds, that is, the (B) and (B-2) component and the (D) other polymerizing compounds that can be used together therewith, to a mass of an entire ink composition of the invention, is preferably in the range of 45 to 95 mass percent and more preferably in the range of 50 to 90 mass percent.

Furthermore, in the ink composition according to the second embodiment of the invention, the (B) and (B-2) components are contained, to a total content of the polymerizing compounds contained in the ink composition (that is, a total content of the (B) and (B-2) components and the (D) component), preferably 7 mass percent or more, more preferably 10 mass percent or more and still more preferably 15 mass percent or more.

In the ink composition according to the third embodiment of the invention, a total content of the polymerizing compounds, that is, a sum total of contents of the (B) and (B-3) components and the (D) other polymerizing compounds that can be used together therewith, to a mass of an entire ink composition of the invention, is preferably in the range of 45 to 95 mass percent and more preferably in the range of 50 to 90 mass percent.

Furthermore, in the ink composition according to the third embodiment of the invention, the (B) and (B-2) components are contained, to a total content of the polymerizing compounds contained in the ink composition (that is, a total content of the (B) and (B-3) components and the (D) component), preferably 7 mass percent or more, more preferably 10 mass percent or more and still more preferably 15 mass percent or more.

As the radical polymerizing compound in the invention, as far as it is a compound that has a radical polymerizable ethylenic unsaturated bond at least one in a molecule, any compounds can be used. Ones having all chemical forms such as monomer, oligomer and polymer are contained. The radical polymerizing compounds may be used singularly or in a combination of two or more kinds at an arbitrary ratio in order to improve intended characteristics. Preferably, two or more kinds are used together from a viewpoint of controlling performances such as the reactivity and the physical property.

Examples of polymerization compounds having radical polymerizable ethylenic unsaturated bond include unsaturated carboxylic acids such as acrylic acid, methacrylic acid, itaconic acid, crotonic acid, isocrotonic acid and maleic acid and salts thereof, and radical polymerizable compounds such as alhydrides having ethylenic unsaturated group, acrylonitrile, styrene, various kinds of unsaturated polyesters, unsaturated polyethers, unsaturated polyamides and unsaturated urethanes.

Specifically, examples thereof include acrylic acid-derivatives such as carbitol acrylate, tetrahydrofurfuryl acrylate, benzyl acrylate, bis(4-acryloxypolyethoxyphenyl)propane, dipentaerythritol tetraacrylate, trimethylolpropane triacrylate, oligo ester acrylate, N-methylol acrylic amide, diacetone acrylic amide, and epoxy acrylate; and methacrylic acid derivatives such as methyl methacrylate, n-butyl methacrylate, allyl methacrylate, glycidyl methacrylate, benzyl methacrylate and dimethylaminomethyl methacrylate; and derivatives of allyl compounds such as allyl glycidyl ether, diallyl phthalate and triallyl trimellitate; and, more specifically, commercially available and well-known radical polymerizable or crosslinkable monomers, oligomers and polymers described in edited by S. Yamashita et al., "Crosslinking Agent Handbook", Taisei Co., Ltd. (1981), edited by K. Kato et al., "UV, EB Curables Handbook (Materials)", Kobunshi Kankokai (1985), edited by Radotek Kenkyukai, "UV, EB Curing Technology, Application and Market", pp. 79, CMC Co. Ltd. (1989), and E. Takiyama, "Polyester Resin Handbook", Nikkan Kyogyo Shinbunsha (1988).

Furthermore, as the radical polymerizable compounds, photo-curable polymerization materials that are used in photo-polymerizable compositions described in, for instance, JP-A No. 7-159983, JP-B No. 7-31399, JP-A Nos. 8-224982, 10-863 and 9-134011 are known and these can be applied as well in the ink composition of the invention.

Furthermore, as the radical polymerizable compound, vinyl ether compounds can be preferably used. Examples of preferably usable vinyl ether compounds include di- or tri-vinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butane diol vinyl ether, hexane diol divinyl ether, cyclohexane dimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-O-propylene carbonate, dodecylvinyl ether, diethylene glycol monovinyl ether and octadecyl vinyl ether.

Of the vinyl ether compounds, the di- or tri-vinyl ether compounds and divinyl ether compounds in particular are preferred when consideration is given to curing performance, degree of adhesion and surface hardness. The vinyl ether compounds can be used singularly or in a combination of two or more appropriate kinds.

As the other polymerizing compounds, (meth)acrylic esters (hereinafter, appropriately, referred to as acrylate compound) such as (meth)acrylic monomers or prepolymers, epoxy monomers or prepolymers and urethanic monomers or prepolymers can be preferably used. More preferably, compounds below can be cited.

Examples thereof include hydroxypivalic acid neopentyl glycol diacrylate, 2-acryloyloxyethyl phthalic acid, tetramethylol methane triacrylate, 2-acryloyloxyethyl-2-hydroxyethyl phthalic acid, dimethyloltricyclodecane diacrylate, ethoxylated phenyl acrylate, 2-acryloloxydiethyl succinic acid, nonylphenol EO adduct acrylate, modified glycerin triacrylate, bisphenol A diglycidyl ether acrylic acid adduct, modified bisphenol A diacrylate, 2-acryloyloxyethylhexahydrophthalic acid, bisphenol A PO adduct diacrylate, bisphenol A EO adduct diacrylate, dipentaerythritol hexaacrylate, pentaerythritol triacrylate, tolylenediisocyanate urethane prepolymer, lactone-modified flexible acrylate, propylene glycol diglycidyl ether acrylic acid adduct, pentaerythritol triacrylate hexamethylene diisocyanate urethane prepolymer, ditrimethylolpropane tetraacrylate, pentaerythritol triacrylate hexamethylene diisocyanate urethane prepolymer, stearyl acrylate, isoamyl acrylate, isomyristyl acrylate, isostearyl allylacrylate and lactone-modified acrylate.

The acrylate compounds, in comparison with polymerizing compounds that have been used in existing UV-curable ink, are smaller in the dermal irritancy and sensitizing property (irritability), can relatively lower the viscosity, can obtain more stable ink dischargeability and are more excellent in the polymerization sensitivity and the adhesiveness with a recording medium.

Furthermore, monomers cited here, in spite of low molecular weight, are small in the sensitizing property, high in the reactivity, low in the viscosity and excellent in the adhesiveness with the recording medium.

In order to further improve the sensitivity, lower the bleeding and improve the adhesiveness with the recording medium, monoacrylate containing the (B) component and polyfunctional acrylate monomer or polyfunctional acrylate oligomer having a molecular weight of 400 or more, preferably 500 or more can be preferably used together.

In particular, in an ink composition that is used to record on a flexible recording medium such as a PET film or PP film, when monoacrylate selected from a group of the compounds, one kind selected from the (B) components and the polyfunctional acrylate monomer or polyfunctional acrylate oligomer are used together, while imparting the flexibility to the film and improving the adhesiveness with the film, the film strength can be preferably heightened.

Furthermore, a mode where at least three kinds of polymerizing compounds of a mono-functional monomer, a bifunctional monomer and a polyfunctional monomer of trifunctional or more are used together can be cited as a preferable mode from a viewpoint of, while maintaining the safety, further improving the sensitivity, lowering the bleeding and improving the adhesiveness with the recording medium.

As the monoacrylate, stearyl acrylate, isoamyl acrylate, isomyristyl acrylate and isostearyl acrylate can be preferably used from a viewpoint in that the sensitivity is high, the contractile property is small to be capable of inhibiting curl from occurring, the bleeding can be inhibited, odor of printed matter can be inhibited and an illumination device can be reduced in the cost.

As the oligomer that can be used together with the monoacrylate, epoxy acrylate oligomer and urethane acrylate oligomer are particularly preferable.

The methacrylate is lower in the skin irritancy than the acrylate.

Among the compounds, when alkoxy acrylate is used at an amount of 70 mass percent or less and a balance is acrylate, excellent sensitivity, the bleed inhibition characteristics and the odor inhibition characteristics can be preferably obtained.

In the invention, when the acrylate compound is used as the (D) other polymerizable compound, to a total mass of the other polymerizable compound [that is, a total amount of the (D) component], the acrylate compound is preferably contained 30 mass percent or more, more preferably 40 mass percent or more and still more preferably 50 mass percent or more. Furthermore, all of the (D) other polymerizable compound that is used together may be made the acrylate compound.

In the invention, as to the selection of the polymerization initiator and polymerizable compound, in accordance with various objects (for instance, as a countermeasure for inhibiting the sensitivity from deteriorating owing to a shielding effect of a colorant that is used in ink composition), other than a combination of the radical polymerizable compound and the radical polymerization initiator, a radical and cation hybrid type curable ink composition where, together with the above, a radical/cation hybrid type curable ink composition where a cationic polymerizable compound and a cationic polymerization initiator such as shown below are used together may be formed.

The cationic polymerizable compound that can be used in the invention, as far as it is a compound that starts a polymerization reaction due to an acid generated from a photo-acid generating agent to cure, is not particularly restricted. Various kinds of known cationic polymerizable monomers known as cationic photopolymerizable monomers can be used. As the cationic photopolymerizable monomers, epoxy compounds, vinyl ether compounds and oxetane compounds described in, for instance, JP-A Nos. 6-9714, 2001-31892, 2001-40068, 2001-55507, 2001-310938, 2001-310937 and 2001-220526 can be cited.

Furthermore, as the cationic polymerizable compounds, polymerizable compounds that are applied to, for instance, cationic polymerizable photo-curable resins are known. Recently, the polymerizable compounds that can be applied to cationic photopolymerizable photo-curable resins that are sensitized in a visible wavelength region of 400 nm or more are disclosed in, for instance, JP-A Nos. 6-43633 and 8-324137. These as well can be applied to the ink composition of the invention.

In the invention, as the cationic polymerization initiators (photo-acid generating agents) that can used together with the cationic polymerizable compounds, for instance, chemical amplification type photoresist or compounds that are used in cationic photopolymerization are used ("Imaging-Yo Yuuki Zairyo (Organic Material for Imaging)", edited by Yuuki Electronics Zairyo Kenkyukai, published by Bunshin Shuppan (1993), pages 187-192.

Examples of suitable cationic polymerization initiator will be shown below.

That is, firstly, $B(C_6F_5)_4^-$, $PF_6^-$, $AsF_6^-$, $SbF_6^-$ or $CF_3SO_3^-$ salt of aromatic onium compounds such as diazonium, ammonium, iodonium, sulfonium and phosphonium can be cited. Secondly, sulfonated compounds that generate a sulfonic acid can be cited. Thirdly, a halide that photo-generates hydrogen halide can be used as well. Fourthly, an iron arene complex can be cited.

The cationic polymerization initiators such as mentioned above may be used singularly or in a combination of two or more kinds.

[(E) Sensitizing Dye]

In the ink composition according to the invention, in order to promote decomposition due to active ray irradiation of the (A) polymerization initiator, a (E) sensitizing dye can be added. The sensitizing dye absorbs a particular active radiation to form an electronically excited state. The electronically-excited sensitizing dye comes into contact with a polymerization initiator to generate actions such as electron transfer, energy transfer and heat generation, thereby a chemical change of the polymerization initiator, that is, decomposition and generation of radicals, acids or bases are forwarded.

As the sensitizing dye, a compound corresponding to an wavelength of the active radiation that makes a (A) polymerization initiator that is used in the ink composition generate an initiation seed can be used. However, considering that the sensitizing dye is used in a curing reaction of a general ink composition, as preferable examples of the sensitizing dyes, ones that belong to compound groups below and have an absorption wavelength in the range of 350 to 450 nm can be cited.

Examples thereof include polynuclear aromatics (for instance, anthracene, pyrene, perylene and triphenylene), thioxanthones (for instance and isopropyl thioxanthone), xanthenes (for instance, fluorescein, eosin, erythrosin, rhodamine B and rose bengal), cyanines (for instance, thiacarbocyanine and oxacarbocyanine), merocyanines (for instance, merocyanine and carbomerocyanine), thiazines (for instance, thionine, methylene blue and toluidine blue), acridines (for instance, acridine orange, chloroflavin and acriflavine), anthraquinones (for instance, anthraquinone), squaliums (for instance, squalium) and coumarins (for instance, 7-diethylamino-4-methylcoumarin), the polynuclear aromatics and thioxanthenes being cited as preferable ones.

More preferable examples of the sensitizing dyes include compounds represented by the following formulas (III) to (VII).

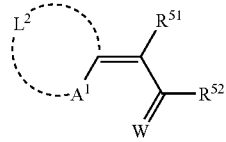

(III)

In the formula (III), $A^1$ expresses a sulfur atom or $NR^{50}$, $R^{50}$ expresses an alkyl group or an aryl group, $L^2$ expresses a non-metal atom group that forms a basic nucleus of a dye in association with an adjacent $A^1$ and an adjacent carbon atom, $R^{51}$ and $R^{52}$, respectively and independently, express a hydrogen atom or a monovalent non-metal atom group, and $R^{51}$ and $R^{52}$ may combine each other to form an acidic nucleus of a dye. W expresses an oxygen atom or a sulfur atom.

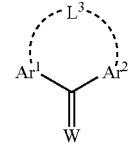

(IV)

In the formula (IV), $Ar^1$ and $Ar^2$, respectively and independently, express an aryl group and are bound each other through a bond due to —$L^3$—. Here, $L^3$ expresses —O— or —S—. Furthermore, W is same as one shown in the formula (III).

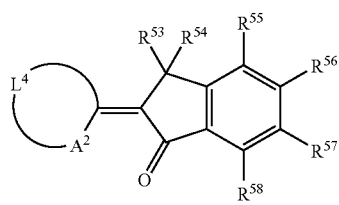

(V)

In the formula (V), $A^2$ expresses a sulfur atom or $NR^{59}$, $L^4$ expresses a non-metal atom group that forms a basic nucleus of a dye in association with an adjacent $A^2$ and carbon atom, $R^{53}$, $R^{54}$, $R^{55}$, $R^{56}$, $R^{57}$ and $R^{58}$, respectively and independently, express a group of a monovalent non-metal atom group, and $R^{59}$ expresses an alkyl group or an aryl group.

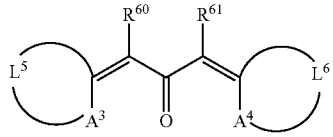

(VI)

In the formula (VI), $A^3$ and $A^4$, respectively and independently, express —S— or —$NR^{62}$— or —$NR^{63}$—, $R^{62}$ and $R^{63}$, respectively and independently, express a substituted or non-substituted alkyl group or a substituted or non-substituted aryl group, $L^5$ and $L^6$, respectively and independently, express a non-metal atom group that forms a basic nucleus of a dye in association with adjacent $A^3$ and $A^4$ and an adjacent carbon atom, and $R^{60}$ and $R^{61}$, respectively and independently, express a hydrogen atom or a monovalent non-metal atom group or can combine each other to form an aliphatic or aromatic ring.

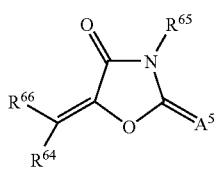

(VII)

In the formula (VII), $R^{66}$ expresses an aromatic ring or a hetero ring that may have a substituent group, and $A^5$ expresses an oxygen atom, a sulfur atom or =$NR^{67}$. $R^{64}$, $R^{65}$ and $R^{67}$, respectively and independently, express a hydrogen atom or a monovalent non-metal atom group, $R^{67}$ and $R^{64}$ and $R^{65}$ and $R^{67}$, respectively, may combine each other to form an aliphatic or aromatic ring.

As preferable and specific examples of compounds expressed by the formulas (III) through (VII), ones shown below can be cited.

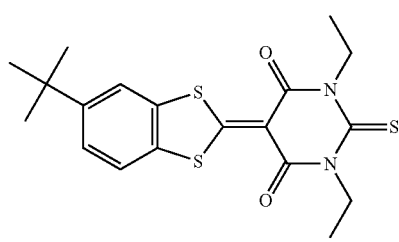

(E-1)

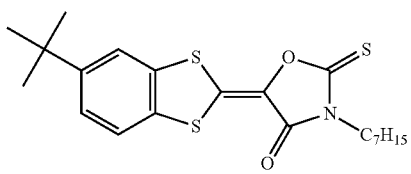

(E-2)

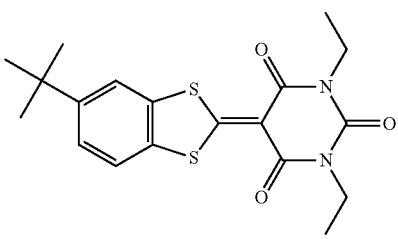

(E-3)

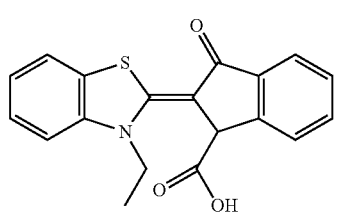

(E-4)

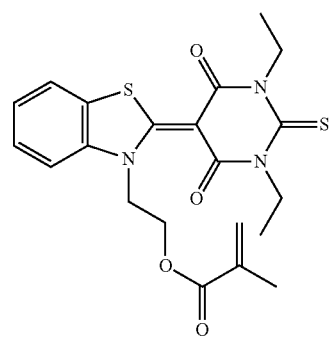

(E-5)

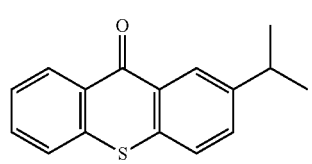

(E-6)

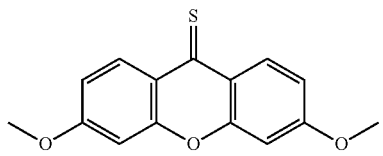

(E-7)

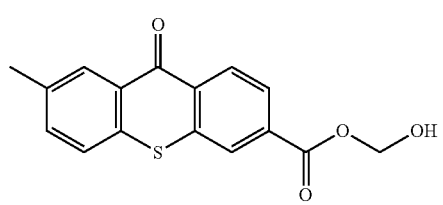

(E-8)

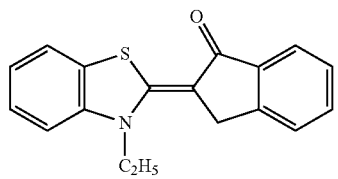

(E-9)

-continued (E-10) 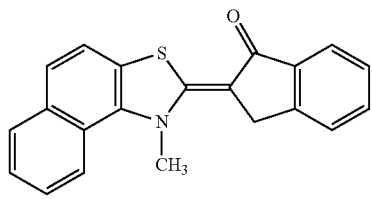

(E-11) 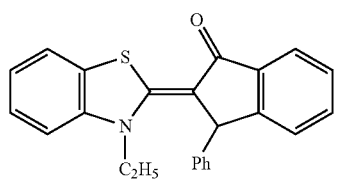

(E-12) 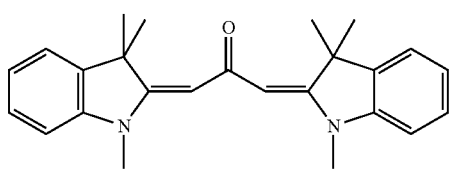

(E-13) 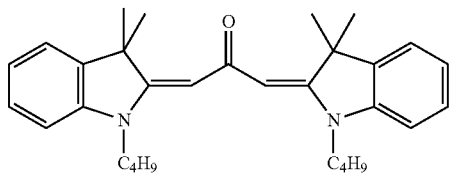

(E-14) 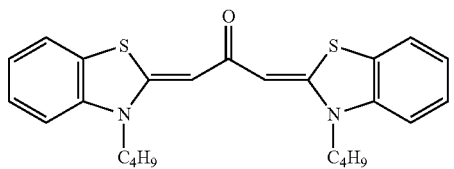

(E-15) 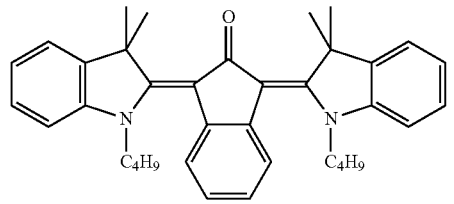

(E-16) 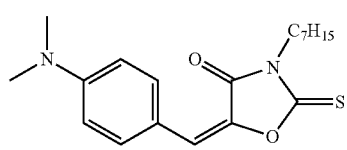

(E-17) 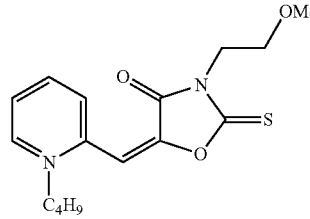

-continued (E-18) 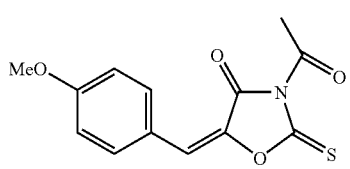

(E-19) 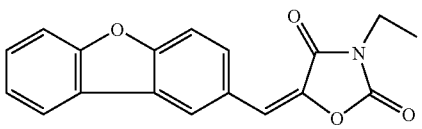

(E-20) 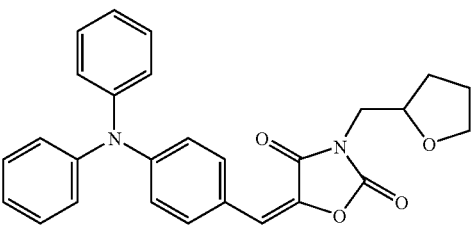

[(F) Cosensitizing Agent]

The ink composition of the invention can contain a cosensitizing agent. In the invention, the cosensitizing agent further improves the sensitivity to active radiation of the sensitizing dye or inhibits oxygen from disturbing a polymerization reaction of a polymerizing compound.

Examples of such cosensitizing agents include amines, for instance, compounds described in M. R. Sander et al., Journal of Polymer Society, Vol. 10, p. 3173 (1972), JP-B-44-20189, JP-A Nos. 51-82102, 52-134692, 59-138205, 60-84305, 62-18537 and 64-33104, and Research Disclosure No. 33825, and specifically, include triethanolamine, p-dimethylaminobenzoic acid ethyl ester, p-formyldimethylaniline and p-methylthiodimethylaniline.

Other examples of the cosensitizing agents include thiols and sulfides, for instance, thiol compounds described in JP-A No. 53-702, JP-B No. 55-500806 and JP-A No. 5-142772, disulfide compounds described in JP-A-56-75643, and specifically, 2-mercaptobenzothiazole, 2-mercaptobenzoxazole, 2-mercaptobenzimidazole, 2-mercapto-4(3H)-quinazoline and β-mercaptonaphthalene.

Further other examples include amino acid compounds (for instance, N-phenylglycine), organometallic compounds described in JP-B No. 48-42965 (for instance, tributyltinacetate), hydrogen donors described in JP-B No. 55-34414, sulfur compounds described in JP-A No. 6-308727 (for instance, trithiane), phosphorus compounds described in JP-A No. 6-250387 (for instance, diethylphosphite) and Si—H, Ge—H compounds described in JP-A No. 8-65779.

[(G) Other Components]

In the ink composition of the invention, as needs arise, other components can be added. As the other components, for instance, a polymerization inhibitor and a solvent can be cited.

The polymerization inhibitor can be added to improve the storage stability. Furthermore, when the ink composition of the invention is used as an ink composition for inkjet recording, the ink composition is preferably discharged after heating to a temperature in the range of 40 to 80° C. to lower the viscosity. Accordingly, in order to inhibit as well a head from being clogged due to thermal polymerization, the polymerization inhibitor is preferably added. The polymerization inhibitor is added, to a total amount of the ink composition of the invention, preferably in the range of 200 to 20,000 ppm. As the polymerization inhibitor, for instance, hydroquinone, benzoquinone, p-methoxyphenol, TEMPO, TEMPOL and cupferron A1 can be cited.

Considering that the ink composition according to the invention is a radiation-curable ink composition, the composition preferably contains no solvent so that the reaction may occur immediately after deposition to cure the ink composition. However, the ink composition may contain a predetermined solvent as long as it does not affect on the curing speed of ink composition. The solvent may be an organic solvent or water in the invention. In particular, an organic solvent may be added to improve the adhesiveness with the recording medium (support such as paper). Addition of an organic solvent is effective for the prevention of the problem of VOC.

An amount of the organic solvent is, for instance, in the range of 0.1 to 5 mass percent and preferably in the range of 0.1 to 3 mass percent to a mass of a whole ink composition of the invention.

In addition, known compounds may be added to the ink composition according to the invention as necessary. Examples of such additional compounds include a surfactant, a leveling additive, a matting agent, and a resin for adjusting film physical properties such as a polyester resin, a polyurethane resin, a vinyl resin, an acrylic resin, a rubber-based resin or a wax. Furthermore, a tackifier that does not disturb a polymerization reaction is preferably added in view of the improvement in the adhesiveness with recording media such as polyolefin or PET. Specific examples thereof include high-molecular weight adhesive polymers described in JP-A No. 2001-49200, pp. 5 to 6 (for instance, copolymers made of an ester of (meth)acrylic acid and alcohol having an alkyl group having 1 to 20 carbon atoms, an ester of (meth)acrylic acid and alicyclic alcohol having 3 to 14 carbon atoms and as ester of (meth)acrylic acid and of aromatic alcohol having 6 to 14 carbon atoms), and low-molecular weight tackiness-imparting resins having a polymerizable unsaturated bond.

[Property of Ink Composition]

The ink composition of the invention can be preferably used as inkjet recording ink. Preferable physical properties in such usage modes will be described below.

When an ink composition is used as ink for inkjet recording, in view of the dischargeability, at a temperature during the discharge (for instance, 40 to 80° C., preferably 35 to 50° C.), the viscosity is preferably in the range of 7 to 30 mPa·s and more preferably in the range of 7 to 25 mPa·s. For instance, the viscosity at room temperature (25° C.) of the ink composition of the invention is preferably in the range of 35 to 500 mpa·s and more preferably in the range of 35 to 200 mPa·s.

The ink composition according to the invention is preferably appropriately adjusted in a composition ratio so that the viscosity may be in the above range. When the viscosity at room temperature is set high, even when a porous recording medium is used, ink can be avoided from permeating into the recording medium, and thereby uncured monomer can be reduced and odor can be reduced. Furthermore, when an ink drop is deposited, the ink can be inhibited from bleeding, resulting in improving image quality.

The surface tension of the ink composition of the invention is preferably in the range of 20 to 30 mN/m and more preferably in the range of 23 to 28 mN/m. When the ink composition is recorded on various recording media such as polyolefin, PET, coated paper and non-coated paper, from a viewpoint of the bleeding, the surface tension is preferably 20 mN/m or more, and from a viewpoint of the wettability the surface tension is preferably 30 mN/m or less.

<Inkjet Recording Method>

An inkjet recording method according to the invention and an inkjet recording system that can be applied to the inkjet recording method will be described below.

An inkjet recording method of the invention is a method where an ink composition of the invention is discharged on a recording medium (support, recording material) for inkjet recording and active radiation is irradiated on the ink composition discharged on the recording medium to cure the ink to form an image.

That is, the inkjet recording method of the invention includes (a) discharging an ink composition of the invention on a recording medium; and (b) irradiating active radiation on the discharged ink composition to cure the ink composition.

In the inkjet recording method of the invention, when the (a) and (b) steps are included, owing to the ink composition cured on the recording medium, an image is formed.

In the (a) step in the inkjet recording process of the invention, an inkjet recording system detailed below can be used.

[Inkjet Recording System]

An inkjet recording system that can be used in the inkjet recording method of the invention is not particularly restricted. A known inkjet recording system that can achieve intended resolution can be arbitrarily selected and used. That is, all known inkjet recording systems including commercially available ones can discharge ink on a recording medium in the (a) step in the inkjet recording method of the invention.

As the inkjet recording system that can be used in the invention, for instance, a system including an ink supply system, a temperature sensor and an active radiation source can be cited.

The ink supply system includes, for example, a stock tank storing the ink composition according to the invention, a supply pipe, an ink supply tank immediately before an inkjet head, a filter, and a piezoelectric inkjet head. The piezoelectric inkjet head can be operated so that the discharge may be conducted at the resolution of, for instance, 320×320 to 4,000×4,000 dpi, preferably, 400×400 to 1,600×1,600 dpi and more preferably 720×720 dpi to form multi-sized dots of 1 to 100 pl and preferably 8 to 30 pl. The unit "dpi" in the invention means the number of dots per 2.54 cm.

As described above, in the radiation-curable ink like the ink composition according to the invention, the temperature at the time of discharge is preferably maintained constant. Accordingly, the region from the ink supply tank to the inkjet head is preferably thermally insulated and heated. The method of controlling the temperature is not particularly restricted. However, for instance, a temperature sensor is preferably disposed to each of a plurality of piping sites to apply heating control corresponding to the flow rate of ink and the environmental temperature. The temperature sensors may be disposed in the ink supply tank and near the nozzles of the inkjet head. In addition, the heating head unit is preferably thermally shielded or insulated so as to minimize the environmental influence on the system. It is preferable to insulate the head unit from other units and reduce the heat capacity of the entire heating unit in order to shorten the start-up time needed for heating or in order to reduce the loss of heat energy.

The ink composition of the invention is preferably discharged after, by use of the above-mentioned ink-jet recording system the ink composition is heated to a temperature preferably in the range of 40 to 80° C. and more preferably in the range of 35 to 50° C. to lower the viscosity of the ink composition preferably in the range of 7 to 30 mPa·s and more preferably in the range of 7 to 25 mPa·s. In particular, when, as the ink composition of the invention, one of which viscosity at 25° C. is in the range of 35 to 500 mPa·s is used, a large advantage can be preferably obtained. When the method is used, high discharge stability can be realized.

The radiation-curable ink composition like the ink composition of the invention is generally high in the viscosity than that of aqueous ink that is used in ordinary ink-jet recording ink; accordingly, during the discharge, the viscosity largely varies with temperature. The viscosity variation of the ink largely affects to alter a liquid drop size and a liquid drop discharge speed, resulting in deteriorating image quality. Accordingly, the ink temperature during the discharge has to be maintained as constant as possible. Accordingly, in the invention, the ink temperature is set with a width of setting temperature ±5° C., preferably setting temperature ±2° C. and more preferably setting temperature ±1° C.

In the next place, (b) a step of irradiating active radiation on a discharged ink composition to cure the ink composition will be described.

The ink composition discharged on the recording medium is cured when active radiation is irradiated thereon. This is because (A) a polymerization initiator contained in the ink composition of the invention, upon irradiation of active radiation, is decomposed to generate initiation seeds such as radical, acid or base to cause and promote, owing to an action of the initiation seed, a polymerization reaction of the (B) component and the (D) other polymerizable compound that is used together as needs arise. At this time, when, in the ink composition, the (A) polymerization initiator and the (E) sensitizing dye are present together, the (E) sensitizing dye in the system absorbs active radiation to be raised to an excited state. The excited sensitizing dye, when coming into contact with the (A) polymerization initiator, promotes the decomposition of the (A) polymerization initiator to realize a higher sensitivity curing reaction.

Here, the active radiation that is used includes α-rays, γ-rays, electron beam, X-rays, UV-rays, visible rays or IR rays. A peak wavelength of the active radiation is, through depending on the absorption characteristics of the sensitizing dye, preferably in the range of 200 to 600 nm, more preferably in the range of 300 to 450 nm and still more preferably in the range of 350 to 420 nm.

Furthermore, a polymerization initiation system of the ink composition of the invention has sufficient sensitivity even to a low output active radiation. Accordingly, an output of the active radiation is preferably 2,000 mJ/cm$^2$ or less, more preferably in the range of 10 to 2,000 mJ/cm$^2$, still more preferably in the range of 20 to 1,000 mJ/cm$^2$ and particularly preferably in the range of 50 to 800 mJ/cm$^2$.

Furthermore, the active radiation is irradiated at the exposed surface illuminance in the range of 10 to 2,000 mW/cm$^2$ and preferably in the range of 20 to 1,000 mW/cm$^2$.

Mercury lamps, gaseous or solid state lasers and the like are widely used as the active radiation sources, and mercury lamps and metal halide lamps are widely used for UV-curing inkjet recording ink. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

Furthermore, a light-emitting diode (LED) and a laser diode (LD) can be used as the active radiation source. An ultraviolet LED or an ultraviolet LD may be used when an ultraviolet ray source is required. For example, a purple LED having a main emission spectrum in the wavelength range of 365 to 420 nm is available from Nichia Corporation. As to a light source having a still shorter wavelength, U.S. Pat. No. 6,084,250 discloses an LED capable of radiating active radiation having a main emission spectrum in the wavelength range of 300 to 370 nm. Other ultraviolet LED's are also commercially available, and capable of emitting radiations of different UV ranges. The radiation source used in the invention is preferably a UV-LED, and particularly preferably a UV-LED having a peak wavelength in the range of 350 to 420 nm.

The maximum illuminance of LED light on the image recording medium is preferably from 10 to 2,000 mW/cm$^2$, more preferably from 20 to 1,000 mW/cm$^2$, and particularly preferably from 50 to 800 mW/cm$^2$.

The ink composition of the invention is irradiated by such active radiation for 0.01 to 120 s and preferably for 0.1 to 90 s.

Conditions of irradiating active radiation and a fundamental irradiation method are disclosed in JP-A No. 60-132767. Specifically, two light sources are placed on both sides of a head unit including an ink discharger, and the head unit and the light sources are scanned in a so-called shuttle mode. The active radiation is irradiated, after the deposition of the ink, within a constant time (for instance, 0.01 to 0.5 sec, preferably 0.01 to 0.3 sec and more preferably 0.01 to 0.15 sec). Thus, when a period from deposition of the ink to irradiation thereof is controlled to an extremely short period, it becomes possible to inhibit the deposited ink from bleeding before the deposited ink is cured. It also becomes possible to irradiate an ink composition before it penetrates into the depth of a porous recording medium, to which no light is penetrable, and thereby to inhibit the unreacted monomer from remaining, resulting in reducing the odor.

In addition, the ink composition may be cured completely by irradiation from another stationary light source. WO 99/54415 discloses, as an irradiation method, a method of using an optical fiber and a method of irradiating UV rays on a recording area by guiding a collimated light source to a mirror surface disposed on the sidewall of head unit. The irradiation methods may also be used in the invention.

When the inkjet recording method as mentioned above is adopted, even to various recording media of which surface wettability is different, a dot size of the deposited ink can be maintained constant and thereby image quality can be improved. In order to obtain a color image, it is preferable to superpose starting from a color that is lowest in the brightness. When ink is superposed in turn starting from one that is lowest in the brightness, illuminating rays become easy to reach lower ink; accordingly, excellent curing sensitivity, reduction of residual monomers, reduction of odor and an improvement in the adhesiveness can be expected. Furthermore, the irradiation can be performed in block after all colors are discharged. However, exposure for every color is preferable from a viewpoint of promotion of the curing.

Thus, the ink composition of the invention, when cured at high sensitivity due to irradiation of the active radiation, can form an image on a recording medium surface.

<Planographic Printing Plate and Producing Method Thereof>

When, by use of the ink-jet recording method of the invention, an ink composition of the invention is applied and cured on a hydrophilic support, a planographic printing plate can be produced.

In what follows, a producing process of a planographic printing plate, in which an inkjet recording process according to the invention is applied (a producing method of a planographic printing plate of the invention) and a planographic printing plate (a planographic printing plate according to the invention) obtained therewith will be described.

The planographic printing plate of the invention has a hydrophilic support and a hydrophobic image formed on the hydrophilic support. A producing process of the planographic printing plate includes steps below:

(a') discharging an ink composition of the invention on a hydrophilic support; and (b') irradiating active radiation on the discharged ink composition to cure the ink composition to form a hydrophobic image obtained by curing the ink composition on the hydrophilic support.

That is, except that, as a recording medium, a support having a hydrophilic surface suitable for a planographic printing plate support is used, similarly to an inkjet recording method of the invention, a planographic printing plate can be produced.

So far, a planographic printing plate is produced, as mentioned above, in such a manner that a so-called PS plate having a constitution in which a lipophilic photosensitive resin layer is disposed on a hydrophilic support is exposed imagewise to solubilize or cure the exposed portion to form an image, followed by dissolving to remove a non-image portion.

On the other hand, in the planographic printing plate of the invention, by applying a producing method of a planographic printing plate of the invention (inkjet recording method according to the invention), in accordance with digitalized image information, an ink composition is directly discharged on a surface of a hydrophilic support, followed by curing, thereby a hydrophobic image portion is formed. Thus, easier more than ever, a planographic printing plate can be produced.

[Hydrophilic Support Used for Planographic Printing Plate]

The planographic printing plate of the invention has a hydrophilic support and a hydrophobic image formed from an ink composition of the invention on the hydrophilic support.

The support (recording medium) used in the planographic printing plate, on which an ink composition of the invention is discharged is not particularly restricted. All planar supports that have the dimensional stability can be used. However, when image quality of obtained printed matters is considered, a support having a hydrophilic surface is preferable.

A material that is used as a support, when it has the hydrophilicity, can be used as it is as a support. When the material does not have the hydrophilicity, the surface thereof may be rendered hydrophilic.

Examples of materials that can be used as the support include paper, plastic (such as polyethylene, polypropylene or polystyrene)-laminated papers, metal plates (such as aluminum, zinc and copper plates), plastic films (such as cellulose diacetate, cellulose triacetate, cellulose propionate, cellulose lactate, cellulose acetate lactate, cellulose nitrate, polyethylene terephthalate, polyethylene, polystyrene, polypropylene, polycarbonate and polyvinyl acetate films), and papers or plastic films on which above-mentioned metal is laminated or vapor-deposited. As the preferable support, a polyester film and an aluminum plate can be cited. Among these, since the aluminum plate is superior in terms of the dimensional stability and relatively inexpensive, the aluminum plate is preferable.

The aluminum plate is a pure aluminum plate, an alloy plate made of aluminum as a main component with a very small amount of extraneous elements or a plastic film on which a thin film of aluminum or aluminum alloy is laminated. Examples of extraneous elements contained in the aluminum alloy include silicon, iron, manganese, copper, magnesium, chromium, zinc, bismuth, nickel and titanium. The content by percentage of extraneous elements in the alloy is preferably 10 mass percent or less. In the invention, a pure aluminum plate is preferable. However, since completely pure aluminum is difficult to produce from the viewpoint of refining technology, a very small amount of extraneous elements may be contained in the plate. The aluminum plate is not specified in terms of the composition thereof. Thus, known aluminum plates can be appropriately used.

A thickness of the support is preferably in the range of 0.1 to 0.6 mm and more preferably in the range of 0.15 to 0.4 mm.

Prior to usage of the aluminum plate, surface treatment such as the surface-roughening treatment or the anodic oxidation treatment is preferably applied. Owing to the surface treatment, the hydrophilicity can be improved and the adhesiveness between the hydrophobic image and the support can be readily secured. Prior to subjecting the aluminum plate to the surface roughening process, the aluminum plate may be optionally subjected to degreasing treatment to remove rolling oil on the surface with a surfactant, an organic solvent and an aqueous alkaline solution.

The surface-roughening treatment of the aluminum plate surface can be performed by means of various processes such as a mechanical surface-roughening process, an electrochemical surface roughening process (surface roughening process where a surface is electrochemically dissolved) or a chemical surface roughening process (surface roughening process where a surface is chemically selectively dissolved).

As the mechanical surface roughening process, known methods such as a ball polishing process, a brush polishing process, a blast polishing process and a buff polishing process can be cited. Furthermore, a transfer process where in a rolling stage of aluminum a roll with an irregular surface is used to transfer an irregular pattern may be used.

As the electrochemical surface roughening process, a process of performing the surface roughening in an electrolyte solution containing acid such as hydrochloric acid or nitric acid by use of an alternating current or a direct current can be cited. Furthermore, as disclosed in JP-A No. 54-63902, a process where a mixed acid is used can be cited.

An aluminum plate whose surface is roughened is as needs arise subjected to alkali-etching treatment with an aqueous solution of potassium hydroxide or sodium hydroxide and neutralizing treatment, optionally followed by subjecting to the anodic oxidation to improve the wear resistance.

The electrolyte used in the anodic oxidation of the aluminum plate may be any of ones that can form a porous oxide film. In general, sulfuric acid, hydrochloric acid, oxalic acid, chromic acid or a mixed acid thereof can be used. The concentration of the electrolyte may be appropriately decided depending on the kind of electrolyte selected.

The conditions for anodic oxidation cannot be specified as a general rule since conditions vary depending on the electrolyte used. However, the following ranges of conditions are generally suitable: an electrolyte concentration of 1 to 80 mass percent in a solution, a solution temperature of 5 to 70° C., a current density of 5 to 60 A/dm$^2$, a voltage of 1 to 100 V, and an electrolyzing time of 10 s to 5 min. An amount of a formed anodic oxide film is preferably in the range of 1.0 to 5.0 g/m$^2$ and more preferably in the range of 1.5 to 4.0 g/m$^2$. In the range, excellent press life and scratch resistance of a non-image portion of the planographic printing plate can be preferably obtained.

As the support that is used in the invention, a substrate that is provided with such surface treatment and has an anodic oxidation film can be used as it is. However, in order to further improve the adhesiveness with the hydrophobic image, the hydrophilicity and the stain resistance, as needs arise, pore-widening treatment or pore sealing treatment of micropores of the anodic oxidation film, which is described in JP-A Nos. 2001-253181 and 2001-322365, or a treatment where the support is dipped in an aqueous solution containing a hydrophilic compound to render a surface hydrophilic can be appropriately selected and applied. It goes without saying that, in the pore-widening treatment and pore-sealing treatment, without restricting to the above processes, all so far known processes can be applied.

(Pore Sealing Process)

As the pore sealing process, in addition to a vapor sealing process, a single process with fluorozirconic acid, a pore sealing process with an aqueous solution containing an inorganic fluorine compound such as a process with sodium fluoride, a vapor sealing process with lithium chloride added and a pore sealing process with hot water can be applied.

Among these, a pore sealing process with an aqueous solution containing an inorganic fluorine compound, a pore sealing process with water vapor and a pore sealing process with hot water are preferable. These will be described respectively below.

—Pore Sealing Process with Aqueous Solution containing Inorganic Fluorine Compound—

As the inorganic fluorine compounds that can be used in the pore sealing process with an aqueous solution containing an inorganic fluorine compound, metal fluorides can be preferably cited.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid and ammonium fluorophosphate. Among these, sodium fluorozirconate, sodium fluorotitanate, fluorozirconic acid and fluorotitanic acid are preferred.

The concentration of the inorganic fluorine compound in the aqueous solution is, in view of satisfactory sealing of micropores of the anodic oxide film, preferably 0.01 mass percent or more, more preferably 0.05 mass percent or more, and in view of the stain resistance, preferably 1 mass percent or less, and more preferably 0.5 mass percent or less.

The aqueous solution containing an inorganic fluorine compound preferably further contains a phosphate compound. When a phosphate compound is contained, since the hydrophilicity of a surface of the anodic oxide film is improved, the on-press developability and the stain resistance can be enhanced.

Suitable examples of the phosphate compounds include phosphates of metals such as alkali metals and alkaline earth metals.

Specific examples thereof include zinc phosphate, aluminum phosphate, ammonium phosphate, diammonium hydrogenphosphate, ammonium dihydrogenphosphate, mono-ammonium phosphate, mono-potassium phosphate, mono-sodium phosphate, potassium dihydrogenphosphate, dipotassium hydrogenphosphate, calcium phosphate, sodium ammonium hydrogenphosphate, magnesium hydrogenphosphate, magnesium phosphate, ferrous phosphate, ferric phosphate, sodium dihydrogenphosphate, sodium phosphate, disodium hydrogenphosphate, lead phosphate, diammonium phosphate, calcium dihydrogenphosphate, lithium phosphate, phosphotungstic acid, ammonium phosphotungstate, sodium phosphotungstate, ammonium phosphomolybdate, sodium phosphomolybdate, sodium phosphite, sodium tripolyphosphate and sodium pyrophosphate. Among these, sodium dihydrogenphosphate, disodium hydrogenphosphate, potassium dihydrogenphosphate and dipotassium hydrogenphosphate are preferred.

The combination of the inorganic fluorine compound and the phosphate compound is not particularly restricted. However, the aqueous solution preferably contains at least sodium fluorozirconate as the inorganic fluorine compound and at least sodium dihydrogenphosphate as the phosphate compound.

The concentration of the phosphate compound in the aqueous solution is, in view of enhancement of the on-press developability and the stain resistance, preferably 0.01 mass percent or more and more preferably 0.1 mass percent or more, and in view of the solubility, preferably 20 mass percent or less and more preferably 5 mass percent or less.

The ratio of the respective compounds in the aqueous solution is not particularly restricted. However, the mass ratio between the inorganic fluorine compound and the phosphate compound is preferably in the range of 1/200 to 10/1 and more preferably in the range of 1/30 to 2/1.

The temperature of the aqueous solution is preferably 20° C. or more, more preferably 40° C. or more, and preferably 100° C. or less and more preferably 80° C. or less.

The pH of the aqueous solution is preferably 1 or more, more preferably 2 or more, and preferably 11 or less, more preferably 5 or less.

The method for the pore-sealing process with an aqueous solution containing an inorganic fluorine compound is not particularly restricted. Examples thereof include a dipping process and a spray process. One of these processes may be used alone once or a plurality of times, or two or more thereof may be used in combination.

Among these, the dipping method is preferred. In the case of performing the process by using the dipping process, the processing time is preferably 1 s or more, more preferably 3 s or more, and preferably 100 s or less and more preferably 20 s or less.

—Pore Sealing Process with Water Vapor—

Examples of the methods of the pore-sealing process with water vapor include a method of continuously or discontinuously bringing water vapor into contact with the anodic oxide film under applied pressure or normal pressure.

The temperature of the water vapor is preferably 80° C. or more, more preferably 95° C. or more, and preferably 105° C. or less.

The pressure of the water vapor is preferably in the range of (atmospheric pressure-50 mmAq) to (atmospheric pressure+ 300 mmAq) (from $1.008 \times 10^5$ to $1.043 \times 10^5$ Pa).

Furthermore, the time period for which water vapor is contacted is preferably 1 s or more, more preferably 3 s or more, and preferably 100 s or less, more preferably 20 s or less.

—Pore Sealing Process with Hot Water—

Examples of the method of the pore-sealing treatment with hot water (water vapor) include a method of dipping an aluminum plate provided with an anodic oxide film thereon in hot water.

The hot water may contain an inorganic salt (for instance, phosphate) or an organic salt.

The temperature of the hot water is preferably 80° C. or more, more preferably 95° C. or more, and preferably 100° C. or less.

Furthermore, the time period for which the aluminum plate is dipped in hot water is preferably 1 s or more, more preferably 3 s or more, and preferably 100 s or less, more preferably 20 s or less.

As a process of rendering a support hydrophilic in the invention, there is an alkali metal silicate method such as described in U.S. Pat. Nos. 2,714,066, 3,181,461, 3,280,734 and 3,902,734. In the method, a support is dipped in an aqueous solution of sodium silicate or electrochemically processed. In addition to this, a method where potassium fluorozirconate is used, which is described in JP-B No. 36-22063 and a method where polyvinyl phosphonic acid is used, which is described in U.S. Pat. Nos. 3,276,868, 4,153,461 and 4,689,272 can be cited.

In the invention, the support preferably has the centerline average roughness in the range of 0.10 to 1.2 μm. When the centerline average roughness is in the range, excellent adhesiveness with a hydrophobic image, excellent press life and excellent stain resistance can be preferably obtained.

(a') Step of Discharging Ink Composition of the Invention on Hydrophilic Support In the beginning, an ink composition of the invention is discharged on a hydrophilic support. In the step, similarly to one described in the inkjet recording method, an existing known inkjet recording unit can be used. Furthermore, when ink is discharged with the inkjet recording unit, preferable ranges of temperature and viscosity of the ink and a control method thereof are similar as well.

(b') Step of Irradiating Active Radiation on Discharged Ink Composition to cure the Ink Composition to form Hydrophobic Image obtained by curing Ink Composition The ink composition discharged on a surface of the hydrophilic support, upon irradiation of the active radiation, is cured. The detail of the curing mechanism thereof is same as that described in the inkjet recording method. Furthermore, the active radiation sources that are used to cure the ink composition and preferable conditions thereof are same as that described in the inkjet recording method.

When the steps are undergone, a hydrophobic image obtained by curing the ink composition of the invention is formed on a surface of the hydrophilic support, and thereby a planographic printing plate is obtained.

Thus, when a planographic printing plate is produced by applying an inkjet recording process of the invention, even to various planographic printing plate supports different in the surface wettability, dot sizes of deposited ink can be maintained constant, resulting in forming a hydrophobic image with precision.

Furthermore, as mentioned above, the ink composition of the invention can be cured with high sensitivity to active radiation and form a hydrophobic region (hydrophobic image) excellent in the adhesiveness with the support and film quality.

From the above, a planographic printing plate of the invention is high in the image quality and excellent in the press life.

It goes without saying that the ink composition of the invention is useful not only for forming such an image portion of a planographic printing plate but also as an ink composition that is generally used.

EXAMPLE

In what follows, the invention will be more specifically described with reference to examples. However, the present invention is not restricted to modes in the examples.

Examples below involve UV inkjet inks of the respective colors.

Example 1-1

Components below were agitated by means of a high-speed water-cooling agitator, and thereby cyan UV inkjet ink was obtained.

(Cyan Ink Composition)

| | |
|---|---|
| (B): Particular polymerizing compound B-1 (n is 9 by average) | 17.0 parts |
| (D): Actilane 421 (*: trade name, produced by Akcros Corp, acrylate monomer) | 40.0 parts |
| (D): Photomer 2017 (trade name, produced by EChem Corp., UV diluting agent) | 12.4 parts |
| Solsperse 32000 (trade name, produced by Noveon Corp., dispersant) | 0.4 parts |
| (C) Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

Here, *Actilane 421 is propoxylated neopenthyl glycol diacrylate (bifunctional acrylate).

(Evaluation of Ink)

The obtained cyan ink composition was printed on a polyvinyl chloride sheet, followed by allowing passing at a speed of 40 m/min under illumination of light from an iron-doped UV-lamp (power 120 W/cm) to irradiate to cure, and thereby a printed matter was obtained.

At this time, evaluations below were carried out.

With an integrating actiometer UV PowerMAP (trade name, produced by EIT Inc.), exposure energy in the curing step was measured. As a result, it was confirmed that an integrated exposure amount of UV rays on the sheet was substantially 330 mJ/cm$^2$. That is, the ink composition was confirmed cured at high sensitivity.

The curability was evaluated by touching a cured image portion of a printed matter obtained from the ink. As a result, it was confirmed that the tackiness after the curing was completely lost and the curability was excellent.

The adhesiveness with a recording medium was evaluated by means of the crosshatch test. As a result, such high adhesiveness as class 4B was shown.

The crosshatch test was carried out in accordance with ISO2409 (ASTM D 3359). That is, a cured film was crosscut into 25 cuts (6 cuts in both lengthwise and widthwise directions) at intervals of 2.0 mm, an adhesive tape (trade name: Scotch Tape (3M600), produced by Sumitomo 3M Corp.) was strongly affixed to the crosscut portions, followed by peeling off quickly the adhesive tape, and whether the cured film was peeled or not was investigated.

Furthermore, the flexibility was evaluated in such a manner that a sheet was folded 10 times and a degree of fissure generated on the cured film was observed. The folding test results were evaluated in terms of 5 grades (visual evaluation) with a state where there was no fissure ranked at 5 point and 3 point or more was evaluated as a state where there was no problem in practical application. As a result, the cured films, since only slight fissure that does not affect on the printed image was observed, were ranked as 3 point.

Results are shown in Table 1 below.

Example 1-2

Components below were agitated by means of a high-speed water-cooling agitator, and thereby magenta UV inkjet ink was obtained.
(Magenta Ink Composition)

| | |
|---|---|
| (B): Particular polymerizing compound B-1 (n is 13 by average) | 14.0 parts |
| (D): Actilane 421 (*: trade name, produced by Akcros Corp, acrylate monomer) | 41.4 parts |
| (D): Photomer 2017 (trade name, produced by EChem Corp., UV diluting agent) | 16.0 parts |
| Solsperse 32000 (trade name, produced by Noveon Corp., dispersant) | 0.4 parts |
| (C): Cinquasia Mazenta RT-355D (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 8.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained magenta ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Example 1-3

Components below were agitated by means of a high-speed water-cooling agitator, and thereby yellow UV inkjet ink was obtained.
(Yellow Ink Composition)

| | |
|---|---|
| (B): Particular polymerizing compound B-1 (n is 6 by average) | 18.0 parts |
| (D): Actilane 421 (trade name, produced by Akcros Corp, acrylate monomer) | 38.4 parts |
| (D): Photomer 2017 (trade name, produced by EChem Corp., UV diluting agent) | 17.0 parts |
| Solsperse 32000 (trade name, produced by Noveon Corp., dispersant) | 0.4 parts |
| C): Cromophtal Yellow LA (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 6.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained yellow ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evalutated similarly to Example 1-1. Results are shown in Table 1 below.

Example 1-4

Components below were agitated by means of a high-speed water-cooling agitator, and thereby black UV inkjet ink was obtained.
(Black Ink Composition)

| | |
|---|---|
| (B): Particular polymerizing compound B-18 (n is 6 by average) | 9.0 parts |
| (D): Actilane 421 (trade name, produced by Akcros Corp, acrylate monomer) | 48.4 parts |
| (D): Photomer 2017 (trade name, produced by EChem Corp., UV diluting agent) | 16.0 parts |
| Solsperse 32000 (trade name, produced by Noveon Corp., dispersant) | 0.4 parts |
| (C): Microlith Black C-K (trade name, produced by Ciba Specialty Chemicals Corp., pigment) | 2.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 7.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained black ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Example 1-5

Components below were agitated by means of a high-speed water-cooling agitator, and thereby cyan UV inkjet ink was obtained.
(Cyan Ink Composition)

| | |
|---|---|
| (B): Particular polymerizing compound B-19 (n is 18 by average) | 7.0 parts |
| (D): Actilane 422 (*: trade name, produced by Akcros Corp, acrylate monomer) | 69.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-2 (trade name, produced by ISP Europe Corp., vinylether) | 5.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |

-continued

| | |
|---|---|
| Byk 307 (trade name, produced by BYK Chemie, defoaming agent) | 0.05 parts |

Here, *Actilane 422 is dipropylene glycol diacrylate (bifunctional acrylate).

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Example 1-6

Components below were agitated by means of a high-speed water-cooling agitator, and thereby cyan UV inkjet ink was obtained.
(Cyan Ink Composition)

| | |
|---|---|
| (B): Particular polymerizing compound B-1 (n is 9 by average) | 10.0 parts |
| (B): Particular polymerizing compound B-3 (n is 6 by average) | 3.0 parts |
| (B-3): KAYARAD HDDA (* trade name, produced by Nippon Kayaku Co., Ltd., acrylate monomer) | 22.6 parts |
| (D): Actilane 421 (trade name, produced by Akcros Corp, acrylate monomer) | 47.0 parts |
| Solsperse 32000 (trade name, produced by Noveon Corp., dispersant) | 0.4 parts |
| Solsperse 5000 (trade name, produced by Noveon Corp., dispersant) | 0.05 parts |
| (C): Irgalite Blue GLVO (trade name, produced by Ciba Specialty Chemicals Corp., pigment) | 1.4 parts |
| Genorad 16 (trade name, produced by Rahn Corp., stabilizer) | 0.05 parts |
| (D): Rapi-Cure DVE-3 (trade name, produced by ISP Europe Corp., vinylether) | 5.0 parts |
| (A): Lucirin TPO (trade name, produced by BASF Corp., photo-polymerization initiator) | 8.0 parts |
| (A): Benzophenone (photo-polymerization initiator) | 2.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.5 parts |

Here, *KAYARAD HDDA is 1,6-hexane diol diacrylate (bifunctional acrylate).

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Comparative Example 1-1

Components below were agitated by means of a high-speed water-cooling agitator, and thereby cyan UV inkjet ink was obtained.
(Cyan Ink Composition)

| | |
|---|---|
| (D): Actilane 421 (trade name, produced by Akcros Corp, acrylate monomer) | 57.0 parts |
| (D): Photomer 2017 (trade name, produced by EChem Corp., UV-diluting agent) | 12.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Comparative Example 1-2

Components below were agitated by means of a high-speed water-cooling agitator, and thereby cyan UV inkjet ink was obtained.
(Cyan Ink Composition)

| | |
|---|---|
| (B): Particular polymerizing compound B-1 (n is 9 by average) | 20.0 parts |
| (D): Actilane 421 (trade name, produced by Akcros Corp, acrylate monomer) | 37.0 parts |
| (D): Photomer 2017 (trade name, produced by EChem Corp., UV diluting agent) | 12.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

Comparative Example 1-3

Components below were agitated by means of a high-speed water-cooling agitator, and thereby cyan UV inkjet ink was obtained.
(Cyan Ink Composition)

| | |
|---|---|
| (B): Particular polymerizing compound B-1 (n is 9 by average) | 30.0 parts |

-continued

| | |
|---|---|
| (D): Actilane 421 (trade name, produced by Akcros Corp, acrylate monomer) | 32.0 parts |
| (D): Photomer 2017 (trade name, produced by EChem Corp., UV diluting agent) | 7.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained yellow ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 1-1. Results are shown in Table 1 below.

TABLE 1

| | Kind and Content of (B) Particular Polymerizing Compound | | Evaluation | | |
|---|---|---|---|---|---|
| | Kind | Content (mass %) | Exposure Amount (mJ/cm²) | Curability | Adhesiveness | Flexibility |
| Example 1-1 | B-1(n = 9) | 17 | 330 | Excellent | 4B | 3 |
| Example 1-2 | B-1(n = 13) | 14 | 330 | Excellent | 3B | 2 |
| Example 1-3 | B-1(n = 6) | 18 | 330 | Excellent | 4B | 3 |
| Example 1-4 | B-18(n = 6) | 9 | 330 | Excellent | 3B | 3 |
| Example 1-5 | B-19(n = 18) | 7 | 330 | Excellent | 3B | 2 |
| Example 1-6 | B-1(n = 9), B-3(n = 6) | 13(10 + 3) | 330 | Excellent | 4B | 3 |
| Comparative Example 1-1 | — | — | 330 | Excellent | 1B | 1 |
| Comparative Example 1-2 | B-1(n = 9) | 20 | 330 | Excellent | 2B | 1 |
| Comparative Example 1-3 | B-1(n = 9) | 30 | 330 | Sticky | — | — |

As obvious from Table 1, all ink compositions according to Examples 1-1 through 1-6 were cured at high sensitivity and excellent in all of the curability of an image portion, the adhesiveness with a recording medium and the flexibility of an image (film).

On the other hand, an ink composition of Comparative Example 1-1 that does not contain a (B) particular polymerizing compound but contains bifunctional acrylate as a polymerizing compound, though exhibiting excellent curability, was insufficient in the adhesiveness. Accordingly, as a result of the crosshatch test (flexibility), it was a practically problematic level.

Furthermore, an ink composition according to Comparative Example 1-2 that contains a (B) component at 20 mass percent to an entire mass of the ink composition was found, though exhibiting excellent curability, low in the adhesiveness and very low in the flexibility in comparison with Examples.

Still furthermore, an ink composition according to comparative example 1-3 that contains the (B) component at 30 mass percent to an entire mass of the ink composition was cured but caused the stickiness in a cured image (film). Accordingly, the adhesiveness and the flexibility could not be evaluated.

Example 1-7

(Preparation of Support)

With an aluminum alloy containing 0.06 mass percent Si, 0.30 mass percent Fe, 0.025 mass percent Cu, 0.001 mass percent Mn, 0.001 mass percent Mg, 0.001 mass percent Zn, 0.03 mass percent Ti and a balance of Al and unavoidable impurities, molten metal was prepared, followed by applying a molten metal treatment and filtration, further followed by preparing an ingot of a thickness of 500 mm and a width of 1,200 mm by means of a DC casting method. A surface thereof was scalped by substantially 10 mm by average with a surface scalping machine, followed by soaking at 550° C. for substantially 5 hr, after a temperature came down to 400° C., further followed by rolling to a rolled plate having a thickness of 2.7 mm by means of a hot rolling mill. Furthermore, a continuous annealing machine was used to process at 500° C., followed by finishing to a thickness of 0.24 mm by applying cold rolling, and thereby an aluminum plate of JIS 1050 material was obtained. A minor diameter of average grain diameter of the obtained aluminum plate was 50 μm and a major diameter thereof was 300 μm. The aluminum plate was cut to a width of 1,030 mm, followed by applying a surface treatment shown below, and thereby an aluminum support was obtained.

<Surface Treatment>

In the surface treatment, various kinds of treatments (a) through (j) below were continuously applied. After each treatment and water washing, a nip roller was used to drain water.

(a) Mechanical Surface Roughening Treatment

With a suspension liquid containing a polishing agent having the specific gravity of 1.12 (Pumice) and water feeding as a polishing slurry solution on a surface of an aluminum plate, a rotating roller-like shaped nylon brush was used to apply the mechanical surface roughening. An average grain size of the polishing agent was 30 μm and the maximum grain size was 100 μm. The nylon brush was made of 6-10 nylon and had a hair length of 45 mm and a hair diameter of 0.3 mm. The nylon brush had hairs densely planted in holes in a stainless cylinder of φ300 mm. Three rotating brushes were used. A distance between two support rollers (φ200 mm) at a lower portion of the brush was 300 mm. A brush roller was pressed against the aluminum plate so that the load of a driving motor that rotates the brush was increased by 7 kW relative to the load that was applied before the brush roller was pressed against an aluminum plate. A direction of rotation of the brush was same as that in which the aluminum plate moves. The number of rotations of the brush was 200 rpm.

(b) Alkali Etching Treatment

The above-obtained aluminum plate was etched by spraying an aqueous solution of a sodium hydroxide concentration of 2.6 mass percent and an aluminum ion concentration of 6.5 mass percent at 70° C. to dissolve the aluminum plate by 10 g/m$^2$. Thereafter, water washing was applied by spraying.

(c) Desmut Treatment

Desmut treatment was carried out with an aqueous solution of 1 mass percent nitric acid (containing 0.5 mass percent aluminum ions) kept at 30° C. by spraying, followed by water washing by spraying. As the aqueous nitric acid solution used in the desmut treatment, a waste solution obtained in a step where the electrochemical surface roughing treatment was applied using AC in an aqueous nitric acid solution was used.

(d) Electrochemical Surface Roughing Treatment

Electrochemical surface roughing treatment was continuously carried out using an AC voltage of 60 Hz. The electrolytic solution used at this time was an aqueous solution containing 10.5 g/L of nitric acid (including 5 g/L of aluminum ions and 0.007 mass percent of ammonium ion) and the temperature of this electrolytic solution was 50° C. With, as an AC power source waveform, a trapezoidal rectangular wave AC where a time required for a current value to reach a peak from 0 was 0.8 m sec and the duty ratio was 1:1, and with a carbon electrode as a counter electrode, electrochemical surface roughing treatment was carried out. As the auxiliary anode, ferrite was used.

The current density was 30 A/dm$^2$ as a peak current value and an amount of electricity was 220 C/dm$^2$ in total of an amount of electricity when the aluminum plate was an anode. At this time, 5% of the current flowing from the power source was supplied separately to the auxiliary electrode.

Thereafter, the aluminum plate was water washed by spraying.

(e) Alkali Etching Treatment

The aluminum plate was subjected to etching treatment carried out at 32° C. with an aqueous solution containing 26 mass percent sodium hydroxide and 6.5 mass percent aluminum ions by spraying to etch. Thereby, the aluminum plate was etched by an amount of 0.50 g/m$^2$ to remove the smut component primarily containing aluminum hydroxide generated when the preceding electrochemical surface roughing treatment was carried out using AC and also to etch the edge part of the pit produced thereby to smooth the edge part. Then, the aluminum plate was water washed by spraying.

(f) Desmut Treatment

An aqueous solution of 15 mass percent nitric acid (containing 4.5 mass percent aluminum ions) was used to carry out the desmut treatment at 30° C. by spraying, followed by washing with water by spraying. As the aqueous nitric acid solution used in the desmut treatment, a waste solution in a step of carrying out electrochemical surface roughing treatment with AC in an aqueous nitric acid solution was used.

(g) Electrochemical Surface Roughing Treatment

The electrochemical surface roughing treatment was continuously carried out with an AC voltage of 60 Hz. The electrolytic solution used at this time was an aqueous solution containing 5.0 g/L of hydrochloric acid (including 5 g/L of aluminum ions) and the temperature of this electrolytic solution was 35° C. The AC power source waveform had a trapezoidal rectangular AC where a time required for current value to reach a peak from 0 was 0.8 m sec and the duty ratio was 1:1. The electrochemical surface roughing treatment was carried out with a carbon electrode as a counter electrode. As the auxiliary anode, ferrite was used.

The current density was 25 A/dm$^2$ as a peak current value and an amount of electricity was 50 C/dm$^2$ as a total amount of electricity when the aluminum plate was an anode. Then the aluminum plate was water washed by spraying.

(h) Alkali Etching Treatment

The aluminum plate was subjected to etching treatment carried out at 32° C. with an aqueous solution containing 26 mass percent sodium hydroxide and 6.5 mass percent aluminum ions by spraying to etch. The aluminum plate was etched by an amount of 0.12 g/m$^2$ to remove the smut component primarily containing aluminum hydroxide generated when the foregoing electrochemical surface roughing treatment was applied with the AC in the preceding step and also to etch the edged part of the pit produced to thereby round the edged part. Then, the aluminum plate was water washed by spraying.

(i) Desmut Treatment

An aqueous solution of 25 mass percent sulfuric acid (including 0.5 mass percent of aluminum ions) was used to carry out the desmut treatment at 60° C. by spraying, followed by water washing by spraying.

(j) Anodic Oxidation Treatment

With an anodic oxidation unit (respective lengths of first and second electrolysis portions: 6 m, respective lengths of first and second power feeding parts: 3 m and respective lengths of first and second power feeding parts: 2.4 m), the anodic oxidation treatment was carried out. As electrolytic solutions supplied to the first and second electrolysis portions, sulfuric acid was used. Both electrolytic solutions had a sulfuric acid concentration of 50 g/L (containing 0.5 mass percent aluminum ion) at 20° C. Thereafter, water washing was applied by spraying. A final oxide film amount was 2.7 g/m$^2$.

(Preparation and Evaluation of Planographic Printing Plate)

On the above-prepared aluminum support, the ink composition of Example 1-1 was printed, and, similarly to Example 1, an image was formed and cured.

With this as a planographic printing plate, according to methods below, an image and a press life were evaluated.

a. Evaluation of Image

A planographic printing plate prepared with the ink composition of Example 1-6 was mounted on a Heidel KOR-D unit, and ink [VALUES-G Red produced by Dainippon Ink Co. Ltd. for sheet-fed press] and wetting water [Ecolity 2 produced by Fuji Photo Film Co. Ltd.] were supplied to carry out printing. The printed matter after 100 sheets were printed was evaluated by visual observation. As a result, no missing part in the image portion was found and no stain was found in the non-image portion, that is, it was confirmed to be an excellent image.

b. Evaluation of Press Life

When the printing was continued as it was, 5,000 sheets or more of high image quality printed matters where no missing part in the image portion and no stain in the non-image portion was found were obtained and the press life as well was confirmed to be practically no problem.

Example 2-1

Components below were agitated by means of a high-speed water-cooling agitator, and thereby cyan UV inkjet ink was obtained.

(Cyan Ink Composition)

| | |
|---|---|
| (B): Particular polymerizing compound B-1 (n is 9 by average) | 20.0 parts |
| (B-2): Exemplified Compound B-2-5 | 18.4 parts |
| (D): Actilane 421 (*: trade name, produced by Akcros Corp, acrylate monomer) | 31.0 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

* Actilane 421 is propoxylated neopenthyl glycol diacrylate (bifunctional acrylate).

(Evaluation of Ink)

The obtained cyan ink composition was printed on a polyvinyl chloride sheet, followed by allowing passing at a speed of 40 m/min under illumination of light from an iron-doped UV-lamp (power 120 W/cm) to irradiate to cure. A printed matter was obtained.

At this time, evaluations below were carried out.

With an integrating actiometer UV PowerMAP (trade name, produced by EIT Corp.), exposure energy in the curing step was measured. As a result, it was confirmed that an integrated exposure amount of UV rays on the sheet was substantially 330 mJ/cm$^2$. That is, the ink composition was cured at high sensitivity.

The curability was evaluated by touching a cured image portion of a printed matter obtained from the ink. As a result, it was confirmed that the tackiness after the curing was completely lost and the curability was excellent.

The adhesiveness with a recording medium was evaluated by means of the crosshatch test. As a result, such high adhesiveness as class 3B (ASTM) was shown.

The crosshatch test was carried out in accordance with ISO2409 (ASTM D 3359). That is, a cured film was crosscut into 25 cuts (6 cuts in both lengthwise and widthwise directions) at intervals of 2.0 mm, an adhesive tape (trade name: Scotch Tape (3M600), produced by Sumitomo 3M Corp.) was strongly affixed to the crosscut portions, followed by peeling off quickly the adhesive tape, and whether the cured film was peeled or not was investigated.

Furthermore, the flexibility was evaluated in such a manner that a sheet was folded 10 times and a degree of fissure generated on the cured film was observed. The folding test results were evaluated in terms of 5 grades with a state where there was no fissure ranked at 5 point and 3 point or more was evaluated as a state where there was no practical problem. As a result, the cured films, since only slight fissure that does not affect on the printed image was observed, were ranked as 3 point.

Results are shown in Table 2 below.

Example 2-2

Components below were agitated by means of a high-speed water-cooling agitator, and thereby magenta UV inkjet ink was obtained.

(Magenta Ink Composition)

| | |
|---|---|
| (B): Particular polymerizing compound B-1 (n is 13 by average) | 12.0 parts |
| (B-2): Exemplified Compound B-2-7 | 18.0 parts |
| (D): Actilane 421 (trade name, produced by Akcros Corp, acrylate monomer) | 41.0 parts |
| Solsperse 32000 (trade name, produced by Noveon Corp., dispersant) | 0.4 parts |
| (C): Cinquasia Mazenta RT-355D (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 8.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| ITX (trade name, produced by Ciba Specialty Chemicals Corp., thioxantone) | 0.4 parts |
| Byk 307 (trade name, produced by BYK Chemie, defoaming agent) | 0.05 parts |

The obtained magenta ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2 below.

Example 2-3

Components below were agitated by means of a high-speed water-cooling agitator, and thereby yellow UV inkjet ink was obtained.

(Yellow Ink Composition)

| | |
|---|---|
| (B): Particular polymerizing compound B-1 (n is 6 by average) | 20.0 parts |
| (B-2): Exemplified Compound B-2-9 | 17.0 parts |
| (D): Actilane 421 (trade name, produced by Akcros Corp, acrylate monomer) | 36.4 parts |
| Solsperse 32000 (trade name, produced by Noveon Corp., dispersant) | 0.4 parts |
| Cromophtal Yellow LA (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 6.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained yellow ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2 below.

Example 2-4

Components below were agitated by means of a high-speed water-cooling agitator, and thereby black UV inkjet ink was obtained.
(Black Ink Composition)

| | |
|---|---|
| (B): Particular polymerizing compound B-18 (n is 6 by average) | 13.0 parts |
| (B-2): Exemplified Compound B-2-7 | 20.0 parts |
| (D): Actilane 421 (trade name, produced by Akcros Corp, acrylate monomer) | 40.0 parts |
| Solsperse 32000 (trade name, produced by Noveon Corp., dispersant) | 0.4 parts |
| (C): Microlith Black C-K (trade name, produced by Ciba Specialty Chemicals Corp., pigment) | 2.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 7.4 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained black ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2 below.

Example 2-5

Components below were agitated by means of a high-speed water-cooling agitator, and thereby cyan UV inkjet ink was obtained.
(Cyan Ink Composition)

| | |
|---|---|
| (B): Particular polymerizing compound B-19 (n is 18 by average) | 12.0 parts |
| (B-2): Exemplified Compound B-2-1 | 10.0 parts |
| (B-2): Exemplified Compound B-2-5 | 10.0 parts |
| (D): Actilane 422 (* trade name, produced by Akcros Corp, acrylate monomer) | 44.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-2 (trade name, produced by ISP Europe Corp., vinylether) | 5.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

* Actilane 422 is dipropylene glycol diacrylate (bifunctional acrylate).

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2 below.

Example 2-6

Components below were agitated by means of a high-speed water-cooling agitator, and thereby cyan UV inkjet ink was obtained.
(Cyan Ink Composition)

| | |
|---|---|
| (B): Particular polymerizing compound B-1 (n is 9 by average) | 10.0 parts |
| (B): Particular polymerizing compound B-3 (n is 6 by average) | 3.0 parts |
| (B-2): Exemplified Compound B-2-5 | 22.6 parts |
| (D): Actilane 421 (trade name, produced by Akcros Corp, acrylate monomer) | 47.0 parts |
| Solsperse 32000 (trade name, produced by Noveon Corp., dispersant) | 0.4 parts |
| Solsperse 5000 (trade name, produced by Noveon Corp., dispersant) | 0.05 parts |
| (C): Irgalite Blue GLVO (trade name, produced by Ciba Specialty Chemicals Corp., pigment) | 1.4 parts |
| Genorad 16 (trade name, produced by Rahn Corp., stabilizer) | 0.05 parts |
| (D): Rapi-Cure DVE-3 (trade name, produced by ISP Europe Corp., vinylether) | 5.0 parts |
| (A): Lucirin TPO (trade name, produced by BASF Corp., photo-polymerization initiator) | 8.0 parts |
| (A): Benzophenone (photo-polymerization initiator) | 2.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.5 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2 below.

Comparative Example 2-1

Components below were agitated by means of a high-speed water-cooling agitator, and thereby cyan UV inkjet ink was obtained.
(Cyan Ink Composition)

| | |
|---|---|
| (B): Particular polymerizing compound B-1 (n is 9 by average) | 20.0 parts |
| (D): Actilane 421 (* trade name, produced by Akcros Corp, acrylate monomer) | 54.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp.photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2.

Comparative Example 2-2

Components below were agitated by means of a high-speed water-cooling agitator, and thereby cyan UV inkjet ink was obtained.
(Cyan Ink Composition)

| | |
|---|---|
| (B-2): Exemplified Compound B-2-5 | 18.4 parts |
| (D): Actilane 421 (* trade name, produced by Akcros Corp, acrylate monomer) | 51.0 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2.

Comparative Example 2-3

| | |
|---|---|
| (B): Particular Polymerizing Compound B-1 (n is 9 by average) | 20.0 parts |
| (D): Tridecyl acrylate | 18.4 parts |
| (D): Actilane 421 (* trade name, produced by Akcros Corp, acrylate monomer) | 31.0 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2.

Comparative Example 2-4

| | |
|---|---|
| (B): Particular Polymerizing Compound B-1 (n is 9 by average) | 20.0 parts |
| (D): Stearyl acrylate | 18.4 parts |
| (D): Actilane 421 (* trade name, produced by Akcros Corp, acrylate monomer) | 31.0 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2.

Comparative Example 2-5

| | |
|---|---|
| (B): Particular Polymerizing Compound B-1 (n is 9 by average) | 20.0 parts |
| (D): N-butyl acrylate | 18.4 parts |
| (D): Actilane 421 | 31.0 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. A printed matter obtained with the ink was evaluated similarly to Example 2-1. Results are shown in Table 2.

TABLE 2

| | Amount of Exposure (mJ/cm$^2$) | Curability | Adhesiveness (ASTM) | Flexibility |
|---|---|---|---|---|
| Example 2-1 | 330 | Excellent | 3B | 3 |
| Example 2-2 | 330 | Excellent | 3B | 4 |
| Example 2-3 | 330 | Excellent | 4B | 4 |
| Example 2-4 | 330 | Excellent | 3B | 3 |
| Example 2-5 | 330 | Excellent | 4B | 4 |
| Example 2-6 | 330 | Excellent | 4B | 3 |
| Comparative Example 2-1 | 330 | Excellent (slightly sticky) | 1B | 2 |
| Comparative Example 2-2 | 330 | Fault | — | — |
| Comparative Example 2-3 | 330 | Excellent (slightly sticky) | 2B | 3 |
| Comparative Example 2-4 | 330 | Fault (unevenly sticky) | — | — |
| Comparative Example 2-5 | 330 | Excellent | 2B | 1 |

As obvious from Table 2, all ink compositions according to Examples 2-1 through 2-6 were cured at high sensitivity and excellent in all of the curability of an image portion, the adhesiveness with a recording medium and the flexibility of an image (film).

On the other hand, an ink composition of Comparative Example 2-1 that does not contain a (B-2) component, though exhibiting relatively excellent curability, was slightly sticky even after curing and insufficient in the adhesiveness. Accordingly, as a result of the crosshatch test, it was a practically problematic level.

Furthermore, an ink composition according to Comparative Example 2-2 that does not contain the (B) particular polymerizing compound was insufficient in the curability; accordingly, the adhesiveness and the flexibility could not be evaluated.

Still furthermore, an ink composition according to Comparative Example 2-3 that contains, in place of the (B-2) component, tridecyl acrylate (alkyl portion has 13 carbon atoms) was, though relatively excellent in the curability, slightly sticky even after the curing and insufficient in the adhesiveness. Accordingly, as a result of the crosshatch test, it was a practically problematic level.

Furthermore, an ink composition according to Comparative Example 2-4 that contains, in place of the (B-2) component, stearyl acrylate (alkyl portion has 18 carbon atoms) was, though relatively excellent in the curability, slightly sticky even after the curing. Accordingly, the adhesiveness and the flexibility could not be evaluated.

Still furthermore, an ink composition according to comparative example 2-5 that contains, in place of the (B-2) component, butyl acrylate (alkyl portion has 4 carbon atoms) was, though relatively excellent in the curability, insufficient in the adhesiveness. Accordingly, as a result of the crosshatch test, it was a practically problematic level.

Example 2-7

(Preparation of Support)

According to a process similar to that of Example 1-7, a support was prepared and subjected to the surface treatment.
(Preparation and Evaluation of Planographic Printing Plate)

On the aluminum support prepared above, an ink composition of Example 2-5 was printed, and, similarly to Example 2-5, an image was formed and cured.

With this as a planographic printing plate, according to methods below, an image was evaluated and the press life was evaluated.

a. Evaluation of Image

A planographic printing plate prepared with the ink composition of Example 2-5 was mounted on a Heidel KOR-D unit, and ink [VALUES-G Red produced by Dainippon Ink Co. Ltd. for sheet-fed press] and wetting water [Ecolity 2 produced by Fuji Photo Film Co. Ltd.] were supplied to carry out printing. The printed matter after 100 sheets were printed was evaluated by visual observation. As a result, no missing part was found in the image portion and no stain was found in the non-image portion, that is, it was confirmed to be an excellent image.

b. Evaluation of Press Life

When the printing operation was continued as it was, 5,000 sheets or more of high image quality printed matters where no missing part in the image portion and no stain in the non-image portion was found were obtained and thereby the press life was as well confirmed to be practically no problem.

Example 3-1

Components below were agitated by means of a high-speed water-cooling agitator, and thereby cyan UV inkjet ink was obtained.

(Cyan Ink Composition)

| | |
|---|---|
| (B): Particular Polymerizing Compound B-1 (n is 9 by average) | 18.0 parts |
| (B-3): Exemplified Compound B-3-12 | 51.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

(Evaluation of Ink)

The obtained cyan ink composition was printed on a polyvinyl chloride sheet, followed by allowing passing at a speed of 40 m/min under illumination of light from an iron-doped UV-lamp (power 120 W/cm) to irradiate to cure, and thereby a printed matter was obtained.

At this time, evaluations below were carried out.

With an integrating actiometer UV Power MAP (trade name, produced by EIT Corp.), exposure energy in the curing step was measured. As a result, it was confirmed that an integrated exposure amount of UV rays on the sheet was substantially 330 mJ/cm$^2$. That is, the ink composition was cured at high sensitivity.

The curability was evaluated by touching a cured image portion f a printed matter obtained from the ink. As a result, it was confirmed that the tackiness after the curing was completely lost and the curability was excellent.

The adhesiveness with a recording medium was evaluated by means of the crosshatch test. As a result, high adhesiveness was confirmed and its value was 3B (ASTM).

The crosshatch test was carried out in accordance with ISO2409 (ASTM D 3359). That is, a cured film was crosscut into 25 cuts (6 cuts in both lengthwise and widthwise directions) at intervals of 2.0 mm, an adhesive tape (trade name: Scotch Tape (3M600), produced by Sumitomo 3M Corp.) was strongly affixed to the crosscut portions, followed by peeling off quickly the adhesive tape, and whether the cured film was peeled or not was investigated.

Furthermore, the flexibility was evaluated in such a manner that a sheet was folded 10 times and a degree of fissure generated on the cured film was observed. The folding test results were evaluated in terms of 5 grades with a state where there was no fissure ranked at 5 point and point 3 or more was evaluated as a state where there was no practical problem. As a result, the cured films, since only slight fissure that does not affect on the printed image was observed, were ranked as 3 point.

Results are shown in Table 3 below.

Comparative Example 3-2

Components below were agitated by means of a high-speed water-cooling agitator, and thereby magenta UV inkjet ink was obtained.
(Magenta Ink Composition)

| | |
|---|---|
| (B): Particular Polymerizing Compound B-1 (n is 13 by average) | 12.0 parts |
| (B-3): Exemplified Compound B-3-18 | 51.0 parts |
| (D): 2-ethylhexyl acrylate | 8.0 parts |
| Solsperse 32000 (trade name, produced by Noveon Corp., dispersant) | 0.4 parts |
| (C): Cinquasia Mazenta RT355D (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 8.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| ITX (Ciba Specialty Chemicals Corp., thioxanthone) | 0.4 parts |
| Byk 307 (trade name, produced by BYK Chemie, defoaming agent) | 0.05 parts |

The obtained magenta ink composition was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

Example 3-3

Components below were agitated by means of a high-speed water-cooling agitator, and thereby yellow UV inkjet ink was obtained.
(Yellow Ink Composition)

| | |
|---|---|
| (B): Particular Polymerizing Compound B-1 (n is 6 by average) | 20.0 parts |
| (B-3): Exemplified Compound B-3-12 | 17.0 parts |
| (B-3): Exemplified Compound B-3-19 | 36.4 parts |
| Solsperse 32000 (trade name, produced by Noveon Corp., dispersant) | 0.4 parts |
| (C): Cromophtal Yellow LA (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 6.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained yellow ink composition was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

Example 3-4

Components below were agitated by means of a high-speed water-cooling agitator, and thereby black UV inkjet ink was obtained.
(Black Ink Composition)

| | |
|---|---|
| (B): Particular Polymerizing Compound B-18 (n is 6 by average) | 13.0 parts |
| (B-3): Exemplified Compound B-3-25 | 60.0 parts |
| Solsperse 32000 (trade name, produced by Noveon Corp., dispersant) | 0.4 parts |
| (C): Microlith Black C-K (trade name, produced by Ciba Specialty Chemicals Corp., pigment) | 2.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 7.4 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained black ink was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

Example 3-5

Components below were agitated by means of a high-speed water-cooling agitator, and thereby cyan UV inkjet ink was obtained.
(Cyan Ink Composition)

| | |
|---|---|
| (B): Particular Polymerizing Compound B-19 (n is 18 by average) | 12.0 parts |
| (B-3): Exemplified Compound B-3-11 | 10.0 parts |
| (B-3): Exemplified Compound B-3-27 | 54.0 parts |
| Solsperse 32000 (trade name, produced by Noveon Corp., dispersant) | 0.4 parts |

-continued

| | |
|---|---|
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-2 (trade name, produced by ISP Europe Corp., vinylether) | 5.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

Example 3-6

Components below were agitated by means of a high-speed water-cooling agitator, and thereby cyan UV inkjet ink was obtained.

(Cyan Ink Composition)

| | |
|---|---|
| (B): Particular Polymerizing Compound B-1 (n is 9 by average) | 10.0 parts |
| (B): Particular Polymerizing Compound B-3 (n is 6 by average) | 3.0 parts |
| (B-3): Exemplified Compound B-3-18 | 69.6 parts |
| Solsperse 32000 (trade name, produced by Noveon Corp., dispersant) | 0.4 parts |
| Solsperse 5000 (trade name, produced by Neveon Corp., dispersant) | 0.05 parts |
| (C): Irgalite Blue GLVO (trade name,, produced by Ciba Specialty Chemicals Corp., pigment) | 1.4 parts |
| Genorad 16 (trade name, produced by Rahn Corp., stabilizer) | 0.05 parts |
| (D): Rapi-Cure DVE-3 (trade name, produced by ISP Europe Corp., vinylether) | 5.0 parts |
| (A): Lucirin TPO (trade name, produced by BASF Corp., photo-polymerization initiator) | 8.0 parts |
| (A): Benzophenone (photo-polymerization initiator) | 2.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.5 parts |

The obtained cyan ink composition was printed on a polyvinyl chloride sheet, followed by allowing passing at a speed of 40 m/min under illumination of light from an iron-doped UV-lamp (power 120 W/cm) to irradiate. The printed matter obtained with the ink was evaluated similarly to Example 3-1. Results are shown in Table 3 below.

Comparative Example 3-1

Components below were agitated by means of a high-speed water-cooling agitator, and thereby cyan UV inkjet ink was obtained.

(Cyan Ink Composition)

| | |
|---|---|
| (B): Particular Polymerizing Compound B-1 (n is 9 by average) | 69.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. The printed matter obtained with the ink was evaluated similarly to Example 3-1. Results are shown in Table 3 below.

Comparative Example 3-2

Components below were agitated by means of a high-speed water-cooling agitator, and thereby cyan UV inkjet ink was obtained.

(Cyan Ink Composition)

| | |
|---|---|
| (B): Particular Polymerizing Compound B-1 (n is 9 by average) | 59.4 parts |
| Solsperse 32000 (trade name, produced by Noveon Corp., dispersant) | 0.4 parts |
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp. photo-polymerization initiator) | 54.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

Comparative Example 3-3

| | |
|---|---|
| (B): Particular Polymerizing Compound B-1 (n is 9 by average) | 18.0 parts |
| Diacrylate of polyethylene glycol (average molecular weight: 400) | 51.4 parts |
| Solsperse 32000 (trade name, produced by Noveon Corp., dispersant) | 0.4 parts |

-continued

| | |
|---|---|
| (C): Irgalite Blue GLVO (trade name, produced by Ciba Specialty Chemicals Corp., pigment) | 3.6 parts |
| Genorad 16 (trade name, produced by Rahn Corp., stabilizer) | 0.05 parts |
| (D): Rapi-Cure DVE-3 (trade name, produced by ISP Europe Corp., vinylether) | 10.0 parts |
| (A): Lucirin TPO (trade name, produced by BASF Corp., photo-polymerization initiator) | 8.5 parts |
| (A): Benzophenone (photo-polymerization initiator) | 4.0 parts |
| (A): Irgacure 184 (trade name, produced by Ciba Specialty Chemicals Corp., photo-polymerization initiator) | 4.0 parts |
| Byk 307 (trade name, produced by BYK Chemie, defoaming agent) | 0.05 parts |

The obtained cyan ink composition was printed on a polyvinyl chloride sheet, followed by allowing passing at a speed of 40 m/min under illumination of light from an iron-doped UV-lamp (power 120 W/cm) to irradiate. The printed matter obtained from the ink was evaluated similarly to Example 3-1. Results are shown in Table 3 below.

TABLE 3

| | Amount of Exposure (mJ/cm$^2$) | Curability | Adhesiveness (ASTM) | Flexibility |
|---|---|---|---|---|
| Example 3-1 | 330 | Excellent | 3B | 3 |
| Example 3-2 | 330 | Excellent | 4B | 5 |
| Example 3-3 | 330 | Excellent | 4B | 3 |
| Example 3-4 | 330 | Excellent | 3B | 5 |
| Example 3-5 | 330 | Excellent | 4B | 4 |
| Example 3-6 | 330 | Excellent | 4B | 3 |
| Comparative Example 3-1 | 330 | Fault | — | — |
| Comparative Example 3-2 | 330 | Excellent | 2B | 1 |
| Comparative Example 3-3 | 330 | Fault (sticky) | 2B | 3 |

* The folding test was visually carried out with a case where there is found no fissure ranked as 5 point.

As obvious from Table 3, all ink compositions according to Examples 3-1 through 3-6 were cured at high sensitivity and excellent in all of the curability of an image portion and the adhesiveness with a recording medium.

On the other hand, an ink composition of Comparative Example 3-1 that does not contain a (B-3) component was insufficient in the curability. Accordingly, the adhesiveness and the flexibility could not be evaluated.

Furthermore, an ink composition according to Comparative Example 3-2 that does not contain the (B) particular polymerizing compound was, though excellent in the curability, insufficient in the adhesiveness and flexibility; accordingly, results of the crosshatch test were a practically problematic level.

Still furthermore, an ink composition according to Comparative Example 3-3 that contains, in place of the (B-3) component, diacrylate of polyethylene glycol (average molecular weight: 400) was, though relatively excellent in the curability, slightly sticky even after the curing and insufficient in the adhesiveness. Accordingly, as a result of the crosshatch test, it was a practically problematic level.

Example 3-7

(Preparation of Support)
The support was prepared similarly to Example 1-7, followed by applying the surface treatment.

(Preparation and Evaluation of Planographic Printing Plate)
On the aluminum support prepared above, an ink composition of Example 3-2 was printed, and, similarly to Example 3-2, an image was formed and cured.

With this as a planographic printing plate, according to methods below, an image was evaluated and the press life was evaluated.

a. Evaluation of Image
A planographic printing plate prepared with the ink composition of example 3-2 was mounted on a Heidel KOR-D unit, and ink [VALUES-G Red produced by Dainippon Ink Co. Ltd. for sheet-fed press] and wetting water [Ecolity 2 produced by Fuji Photo Film Co. Ltd.] were supplied to carry out printing. The printed matter after 100 sheets were printed was evaluated by visual observation. As a result, no missing part in the image portion was found and no stain was found in the non-image portion, that is, it was confirmed to be an excellent image.

b. Evaluation of Press Life
When the printing operation was continued as it was, 5,000 sheets or more of high image quality printed matters where no missing part in the image portion and no stain in the non-image portion was found were obtained and the press life as well was confirmed to be practically no problem.

All publications, patent applications, and technical standards mentioned in this specification are herein incorporated by reference to the same extent as if each individual publication, patent application, or technical standard was specifically and individually to be incorporated by reference.

What is claimed is:

1. An ink composition comprising:
   (A) a polymerization initiator;
   (B) an ester or amide of a mono-functional acrylic acid having an alkylene oxide repeating unit in a molecule; and
   (C) a colorant,
   wherein (B) the ester or amide of a mono-functional acrylic acid having an alkylene oxide repeating unit in a molecule is a compound expressed by the following formula (I):

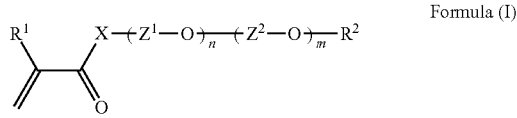

Formula (I)

wherein, in formula (I), R$^1$ denotes a hydrogen atom; X denotes an oxygen atom or NR' in which R' denotes a hydrogen atom or an alkyl group; Z$^1$ denotes an ethylene group and Z$^2$ denotes an alkylene group having 1 to 6 carbon atoms; n is an integer from 3 to 10; m is an integer from 0 to 80; when m is an integer of 1 or more, Z$^1$ and Z$^2$ are not the same; and R$^2$ denotes a hydrogen atom, an alkyl group having 1 to 18 carbon atoms, or an aryl group having 6 to 10 carbon atoms;
wherein a content of (B) the ester or amide of a mono-functional acrylic acid having an alkylene oxide repeating unit in a molecule is in the range of 1 to 18 mass percent with respect to a total mass of the ink composition.

2. The ink composition of claim 1, wherein the ink composition is used for inkjet recording.

3. An inkjet recording method comprising:
   (a) discharging the ink composition of claim 1 onto a recording medium; and (b) irradiating active radiation on the discharged ink composition to cure the ink composition.

4. A method of producing a planographic printing plate, comprising:
(a') discharging the ink composition of claim 1 onto a hydrophilic support; and
(b') irradiating active radiation on the discharged ink composition to cure the ink composition to form a hydrophobic image formed by curing the ink composition on the hydrophilic support.

5. An ink composition comprising:
(A) a polymerization initiator;
(B) an ester or amide of a mono-functional acrylic acid having an alkylene oxide repeating unit in a molecule;
(B-2) an ester or amide of a mono-functional (meth)acrylic acid having an alkyl portion having 6 to 12 carbon atoms; and
(C) a colorant;
wherein (B) the ester or amide of a mono-functional acrylic acid having an alkylene oxide repeating unit in a molecule is a compound expressed by the following formula (I):

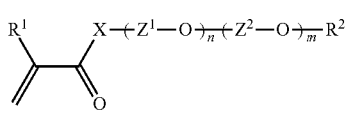

Formula (I)

wherein, in formula (I), $R^1$ denotes a hydrogen atom; X denotes an oxygen atom or NR' in which R' denotes a hydrogen atom or an alkyl group; $Z^1$ denotes an ethylene group and $Z^2$ denotes an alkylene group having 1 to 6 carbon atoms; n is an integer from 3 to 10; m is an integer from 0 to 80; when m is an integer of 1 or more, $Z^1$ and $Z^2$ are not the same; and $R^2$ denotes a hydrogen atom, an alkyl group having 1 to 18 carbon atoms, or an aryl group having 6 to 10 carbon atoms wherein a content of the (B-2) ester or amide of a mono-functional (meth)acrylic acid having an alkyl portion having 6 to 12 carbon atoms is in the range of 10 to 35 mass percent with respect to a total mass of the ink composition.

6. The ink composition of claim 5, wherein the ink composition is used for inkjet recording.

7. An inkjet recording method comprising:
(a) discharging the ink composition of claim 5 onto a recording medium; and
(b) irradiating active radiation on the discharged ink composition to cure the ink composition.

8. A method of producing a planographic printing plate, comprising:
(a') discharging the ink composition of claim 5 onto a hydrophilic support; and
(b') irradiating active radiation on the discharged ink composition to cure the ink composition to form a hydrophobic image formed by curing the ink composition on the hydrophilic support.

9. An ink composition comprising:
(A) a polymerization initiator;
(B) an ester or amide of a mono-functional acrylic acid having an alkylene oxide repeating unit in a molecule;
(B-3) polyfunctional (meth)acrylate having a weight average molecular weight of less than 360; and
(C) a colorant;
wherein (B) the ester or amide of a mono-functional acrylic acid having an alkylene oxide repeating unit in a molecule is a compound expressed by the following formula (I):

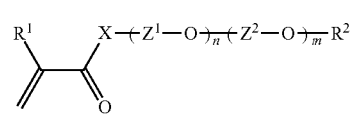

Formula (I)

wherein, in formula (I), $R^1$ denotes a hydrogen atom; X denotes an oxygen atom or NR' in which R' denotes a hydrogen atom or an alkyl group; $Z^1$ denotes an ethylene group and $Z^2$ denotes an alkylene group having 1 to 6 carbon atoms; n is an integer from 3 to 10; m is an integer from 0 to 80; when m is an integer of 1 or more, $Z^1$ and $Z^2$ are not the same; and $R^2$ denotes a hydrogen atom, an alkyl group having 1 to 18 carbon atoms, or an aryl group having 6 to 10 carbon atoms.

10. The ink composition of claim 9, wherein the ink composition is used for inkjet recording.

11. The ink composition of claim 9, wherein the (B-3) polyfunctional (meth)acrylate having a weight average molecular weight of less than 360 is a compound expressed by the following formula (II):

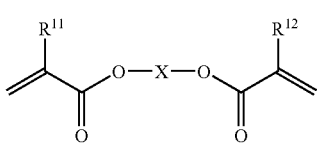

Formula (II)

wherein in formula (II), $R^{11}$ and $R^{12}$ each independently denote a hydrogen atom or a methyl group, and X denotes a divalent organic group.

12. The ink composition of claim 9, wherein a content of the (B-3) polyfunctional (meth)acrylate having a weight average molecular weight of less than 360 is in the range of 10 to 65 mass percent with respect to a total mass of the ink composition.

13. An inkjet recording method comprising:
(a) discharging the ink composition of claim 9 onto a recording medium; and
(b) irradiating active radiation on the discharged ink composition to cure the ink composition.

14. A method of producing a planographic printing plate, comprising:
(a') discharging the ink composition of claim 9 onto a hydrophilic support; and
(b') irradiating active radiation on the discharged ink composition to cure the ink composition to form a hydrophobic image formed by curing the ink composition on the hydrophilic support.

* * * * *